United States Patent
Sinha et al.

(10) Patent No.: US 10,540,365 B2
(45) Date of Patent: Jan. 21, 2020

(54) FEDERATED SEARCH

(71) Applicant: Apple Inc., Cupertino, CA (US)

(72) Inventors: Anoop Sinha, Palo Alto, CA (US); Chetan V. Kale, Cupertino, CA (US); Jason Lee Douglas, Sunnyvale, CA (US); Kelvin So, Sunnyvale, CA (US); Vishnu Vardhan Reddy Konda, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 395 days.

(21) Appl. No.: 14/503,138

(22) Filed: Sep. 30, 2014

(65) Prior Publication Data

US 2015/0347543 A1    Dec. 3, 2015

Related U.S. Application Data

(60) Provisional application No. 62/006,001, filed on May 30, 2014.

(51) Int. Cl.
*G06F 16/338* (2019.01)
*G06F 16/33* (2019.01)
*G06F 16/25* (2019.01)
*G06F 16/9535* (2019.01)
*G06F 16/2457* (2019.01)

(52) U.S. Cl.
CPC ...... *G06F 16/256* (2019.01); *G06F 16/24578* (2019.01); *G06F 16/9535* (2019.01)

(58) Field of Classification Search
CPC ........ G06F 17/30864; G06F 17/30867; G06Q 30/02

USPC .......................................................... 707/706
See application file for complete search history.

(56) References Cited

U.S. PATENT DOCUMENTS 7,962,464 B1 * 6/2011 Brette ................... G06F 16/951
                                                          707/706
8,131,716 B2    3/2012 Chevalier et al.
8,650,173 B2    2/2014 McDonald et al.
(Continued)

FOREIGN PATENT DOCUMENTS

CN       102521223 A    6/2012
CN       103366002 A    10/2013
WO    WO 2008/092039 A1    7/2008

OTHER PUBLICATIONS

PCT International Search Report and Written Opinion for PCT International Appln No. PCT/US2015/032062 dated Jul. 28, 2015. (9 pages).

(Continued)

*Primary Examiner* — Hosain T Alam
*Assistant Examiner* — Robert F May
(74) *Attorney, Agent, or Firm* — Womble Bond Dickinson (US) LLP

(57) ABSTRACT

A method and apparatus that generates a plurality of ranked query results from a query over a plurality of separate search domains. In this embodiment, the device receives the query and determines a plurality of results across the plurality of separate search domains using the query. The device further characterizes the query. In addition, the device ranks the plurality of results based on a score calculated for each of the plurality of results determined by a corresponding search domain and the query characterization, where the query characterization indicates a query type.

24 Claims, 24 Drawing Sheets

(56) References Cited

U.S. PATENT DOCUMENTS

| | | | |
|---|---|---|---|
| 2008/0091633 A1* | 4/2008 | Rappaport | G06N 5/022 706/50 |
| 2008/0109401 A1* | 5/2008 | Sareen | G06F 16/951 |
| 2009/0006332 A1* | 1/2009 | Mowatt | G06F 16/951 |
| 2009/0063457 A1* | 3/2009 | Stewart | G06F 16/9566 |
| 2009/0327226 A1* | 12/2009 | Brito | G06F 16/248 |
| 2010/0023502 A1 | 1/2010 | Marlow | |
| 2010/0153357 A1* | 6/2010 | Slackman | G06F 16/334 707/707 |
| 2011/0055189 A1 | 3/2011 | Effrat et al. | |
| 2011/0087673 A1* | 4/2011 | Chen | G06F 16/951 707/748 |
| 2012/0047135 A1* | 2/2012 | Hansson | G06Q 30/0275 707/731 |
| 2012/0078888 A1* | 3/2012 | Brown | G06F 16/3329 707/723 |
| 2013/0117297 A1* | 5/2013 | Liu | G06F 16/3322 707/767 |
| 2014/0059042 A1 | 2/2014 | Vinay et al. | |

OTHER PUBLICATIONS

PCT Chapter I International Preliminary Report on Patentability (IPRP Chapter I) PCT/US2015/032062 dated Dec. 15, 2016. (7 Pages).
First Office Action for Counterpart Chinese Patent Application No. 201580028327.2 with English Translation and Chinese Search Report, 16 pgs. (dated Feb. 27, 2019).

* cited by examiner

FEDERATED SEARCH

RELATED APPLICATIONS

Applicant claims the benefit of priority of prior, provisional application Ser. No. 62/006,001 filed May 30, 2014, the entirety of which is incorporated by reference.

FIELD OF INVENTION

This invention relates generally to search technology and more particularly to searching over multiple search domains and incorporating user feedback into a citation search index.

BACKGROUND OF THE INVENTION

A user will often perform a query search to lookup information on the Web or from some other data sources. A query search begins with a client receiving the query string, which is sent to a search server. The search server receives query string and searches a search index for results that match this query string. The search server then returns the results to the client. In order to assist the user on the client, the search server may also suggest query completions based on a partially entered query string. The suggested query completions are completed query search strings that the search server has received in the past that includes the client input partial query string. The suggested query completions are presented to the user, so that the user can choose one of the query completions as the string to be used for the search.

After the client receives and presents the results, the user may engage with some of the results (e.g., click on a link for one of the results and spend time interacting with the website referenced by that link) and may also abandon some of these results. The search server, however, does not capture this user feedback so as to incorporate the feedback into its search indices.

SUMMARY OF THE DESCRIPTION

A method and apparatus of a device that performs a multi-domain query search is described. In an exemplary embodiment, the device receives a query prefix from a client of a user. The device further determines a plurality of search completions across the plurality of separate search domains. In addition, the device ranks the plurality of search completions based on a score calculated for each of the plurality of search completions determined by a corresponding search domain, where at least one of the plurality of search completions is used to generate a plurality of search results without an indication from the user and in response to receiving the query prefix.

In another embodiment, the device generates a results cache using feedback from a user's search session. In this embodiment, the device receives a feedback package from a client, where the feedback package characterizes a user interaction with a plurality of query results in the search session that are presented to a user in response to a query prefix entered by the user. The device further generates a plurality of results for a plurality of queries by, running the plurality of queries using the search feedback index to arrive at the plurality of results. In addition, the device creates a results cache from the plurality of results, where the results cache maps the plurality of results to the plurality of queries and the results cache is used to serve query results to a client.

In a further embodiment, the device generates a plurality of ranked query results from a query over a plurality of separate search domains. In this embodiment, the device receives the query and determines a plurality of results across the plurality of separate search domains using the query. The device further characterizes the query. In addition, the device ranks the plurality of results based on a score calculated for each of the plurality of results determined by a corresponding search domain and the query characterization, where the query characterization indicates a query type.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
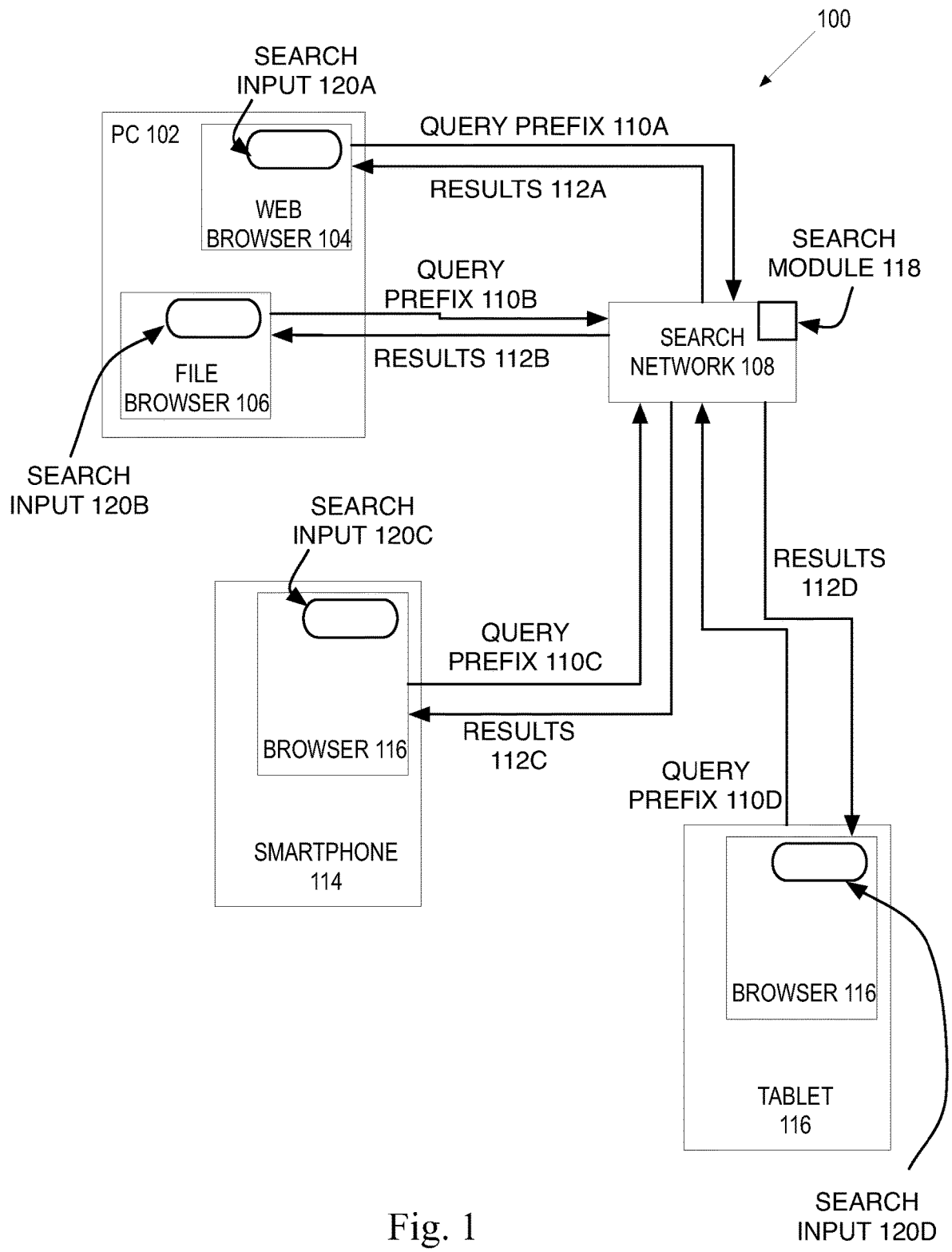
FIG. 1 is a block diagram of one embodiment of a system that returns search results based on input query prefixes.

A method and apparatus of a device that performs a multi-domain query search is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that performs a multi-domain query search is described. In one embodiment, the device receives incremental query prefixes from a client that are input by a user and uses the incremental query prefixes to generate a set of query completions for each query prefix. For example and in one embodiment, if the user enters the string "apple," the device receives the incremental query prefixes for "a," "ap," "app," "appl," and "apple." For each of the query prefixes, the device generates a set of query completions. For example and in one embodiment, the completions for "a" can be "apple.com," "America," or "Annapolis." Similarly, the device can generate a different set of query completions for the other incremental query prefixes. In one embodiment, the device determines the set of query completions from multiple search domains. For example and in one embodiment, the device searches for query completions across search domains such as maps, media, wiki, site, and other search domains. In one embodiment, each of these search domains includes one or more query completion trees that are used to determine possible completions for the input query prefix. In one embodiment, each of the search domains returns a set of scores that the device uses to rank these query completions. For example and in one embodiment, each of search domains returns a set of raw, local, and global scores that can be used by the device to rank the different completions across the different domains.

As described above, traditional systems will returns possible query completions to the user and the user will select one of the possible query completions to use for a query search. In contrast and in one embodiment, the device does not return the set of query completions to the user. Instead, the device ranks the set of query completions and uses a subset of the query completions to determine relevant results for this subset of query completions without presenting the set of query completions to the user or getting an indication which of this set of query completions to use to determine relevant results. In one embodiment, the device performs a search for relevant results across multiple search domains (e.g., maps, media, wiki, sites, other, or another search domain). The device receives a set of results from the multiple search domains and ranks these results based on scores generated from each search domain and cross-domain information. In one embodiment, the device further ranks the relevant results based on a type of the query completion that was used to determine these results. For example and in one embodiment, if the query completion is characterized to be a search for a place, the results from the maps search domain can be ranked higher as well as a wiki entry about this place. As a further example, if the query completion is indicated to be about an artist, the media search domain results can be ranked higher. The device returns the relevant results found for the query completions to the client.

In one embodiment, the user viewing the results might engage or abandon the results. In one embodiment, an engagement event occurs if the user interacts with one of the rendered results presented to the user during a user's search session. For example and in one embodiment, the user could click on a link that is presented for one of the rendered results. In another example, the user could click on the link and spend a time greater than a predetermined time interacting with the object (e.g., a website) referenced by that link (e.g., interacts with the referenced object for more than 60 seconds). In this example, the user may receive results directed towards a query search for the current U.S. President and click on a link that references a web page describing the latest presidential speech. If the user interacts with the website for more than a predetermined time (e.g., 60-90 seconds), the device would determine that the user engaged with the result represented by that link. In another embodiment, the user may ignore or abandon results rendered for the user. For example and in one embodiment, if a user clicks on a link presented for one of the rendered results, but navigates away from that website within a predetermined time (e.g., less than 60-90 seconds), the device determines that this is an abandonment event for that result.

In one embodiment, this feedback can be incorporated into a search index, where the feedback influences the ranking and filtering of the relevant results. In this embodiment, the client that presents and renders the relevant results additionally collects the engagement and abandonment events for a user's search session. The client collects the events into a feedback package and sends this package to a server for processing. In one embodiment, the server receives the feedback package and converts the feedback package into a feedback index entry. In one embodiment, the feedback index entry has the format of <query, result, render counts, engagement counts, abandonment counts>, where query is the input query and context information such as, device type, application, locale, and geographic location, result is the render result, render counts is the number of times the result is rendered for that query, engagement counts is the number of times the result is engaged for that query, and abandonment counts is the number of times that result is abandoned. This entry is incorporated into a feedback search index. In one embodiment, the feedback search index is a search index that incorporates the users feedback into scoring results. For example and in one embodiment, each engagement events for a query result pair promotes that result for the corresponding query. In this example, if a user engages with a result for a particular query, then a future user may also engagement with this result for the same query. Thus, in one embodiment, the result for this query would be returned and ranked higher for a future user having the same query. Conversely, if a user abandons a result for a particular query, then a future user may also abandon this same result for the same query. Thus, in one embodiment, the result for this query may be returned and ranked lower for a future user having the same query.

In one embodiment, the server further uses the feedback search index to generate a results cache that maps queries to results. In one embodiment, the results cache is a cache that maps queries to results, which can be used to quickly return results for a user query. In one embodiment, the results cache is stored in an edge server that is close in proximity to a user's device that can be used to serve one or more results prior to performing a query search. In one embodiment, the server generates the results cache by running a set of queries from a results set to generated an updated results set that incorporates the collected feedback into the results of the update results set. This updated results set is sent to the edge server.

FIG. 1 is a block diagram of one embodiment of a system 100 that returns search results based on input query prefixes. In FIG. 1, the system 100 includes a search network 108 that is couple to device 102, smartphone 114, and tablet 116. In one embodiment, the search network is a network of one or more servers that receives query prefixes for different devices and returns query results back to those devices. For example and in one embodiment, the search network receives query prefixes 110A-D from device 102, smartphone 114, and/or tablet 116 and returns query results 112A-D back to the respective device (e.g., device 102, smartphone 114, and/or tablet 116). In one embodiment, the device 102 can be personal computer, laptop, server, mobile device (e.g., smartphone, laptop, personal digital assistant, music playing device, gaming device, etc.), and/or any device capable requesting and/or displaying a query. In one embodiment, the device can be a physical or virtual device. In one embodiment, the smartphone 114 can be a cellular telephone that is able to perform many function of device 102. In one embodiment, the tablet 116 can be a mobile device that accepts input on a display.

In one embodiment, each of the devices includes a browser that is used to input a query prefix by the user. For example in one embodiment, device 102 includes a web browser 104 and file browser 106. Each of these browsers includes a search input field that is used by the user to input the query prefix. In one embodiment a web browser 104 is a program that all that allows a user to search and retrieve the web for various type of web documents. In one embodiment, the web browser 104 includes a search input field 128. The search input field 128 is used by the user to input a query prefix string. In one embodiment, a query prefix string is a string of text or other symbols that will be used in the query prefix that is sent to the search network 108. The query prefix string can be an incomplete or complete search string that was input by the user. In one embodiment as the user types in the query input string in the search input field 120A, the web browser 104 captures the query prefix string and sends this query prefix string in a query prefix 110 A to the search network. For each symbol or text string entered in the search input field 120A, the web browser 104 creates the query prefix 110A and sends it to the search network 108. In response to receiving the query prefix 110A, the search network creates one or more query completions over multiple search domains and selects one or more of these query completions to create a set of relevant results 112, which is returned to the web browser 104. For example and in one embodiment, as the user enters the text "appl", the web browser 104 creates query prefixes 110A using the query prefix strings "a", "ap", "app", and "appl". For each of these query prefixes 110A, the search network 108 creates a set of query completions from multiple search domains, uses these query completions to determine relevant results, and returns a different set of results for the different query prefixes 110A. This procedure of capturing query prefixes as the user enters the subsequent characters can also be done in a file browser 106. In one embodiment, the file browser 106 includes a search input field 120B, which a user can use to input a query prefix string. In this embodiment, as a user inputs the query prefix string, the file browser 106 creates different query prefixes 110B and sends them to the search network 108. The search network 108 receives the different query prefixes 110B and determines the one or more query completions and returns relevant results as described above. In addition, the query prefixes can be used to perform a query using a metadata database of data stored locally on device 102.

In one embodiment, this same procedure of capturing a query input string as the strings is entered, determining one or more query completions, and using these query completions to determine relevant results can also be performed on the smartphone 114 and tablet 116. In this embodiment, the smart phone 114 includes a browser 116. The browser 116 includes a search input field 120C. Similar as described above, the search input field 120C is used by a user to input a query prefix string. This query prefix string is incrementally captured by the browser 116, which, in turn, creates a set of different query prefixes 110C that is sent to the search network 108. In response to receiving the each of these different query prefixes 110C, the search network 108 determines one or more query completions, and uses these query completions to determine relevant results 112C that are returned back to browser 116. In addition, the tablet 116 includes a browser 118. The browser 118 includes a search input field 120D. Similar as described above, the search input field 120D is used by a user to input a query prefix string. This query prefix string is incrementally captured by the browser 118, which in turn creates a set of different query prefixes 110D that is sent to the search network 108. In response to receiving each of these different query prefixes 110D, the search network 108 determines one or more query completions, and uses these query completions to determine relevant results 112D that are returned back to browser 118. In one embodiment, the search network 108 includes a search module 118 that processes the query completion and returns relevant results. Processing the query completions and returning relevant results is further described in FIGS. 2-7 below.

As described above, a browser on a device sends query prefixes 110A-D to the search network 108. In one embodiment a query prefix 110A-D includes a query prefix string, the location (e.g., latitude/longitude combination), a device type identifier (e.g., computer, smartphone, tablet, etc.), and application type identifier (e.g., web browser (and what type of web browser), file browser), and locale. In this embodiment, by providing the location, device type identifier, application type identifier, and locale, the context in which the query prefix string was entered by the user is provided to the searched network 108. In one embodiment, the search network 108 uses this context and the query prefix string to determine the query completions and relevant results. For example and in one embodiment, the search network 108 can use the location information to determine query completions and results that are relevant to the location of the device that provided the query prefix. As an example, the device location can be used to find search results for places near the current device location. As another example and in another embodiment, the device type identifier can be used by the search network 108 to determine completions and results that are directed to that device type. In this example, if the device type identifier indicated that the query prefix was coming from a smartphone, the search network 108 may give greater weight to results to an application store for the smartphone instead of an application store for personal computer. In a further example and in further embodiment, the application type identifier and locale can also be used to weight completions and results.

In one embodiment, the search network 108 completes the query prefixes using a multi-domain query completion. In this embodiment, the search network 108 sends each received query prefix to each of the search domains used by the search network 108. For example and in one embodiment, the search network 108 sends a received a query prefix to the map search domain, media search domain, wiki search domain, sites search domain, and other search domains. Each of these search domains would determine one or more query completions for that query prefix based on the data contained in that search domain. In addition, each search domain would return a set of scores for each of the one or more query completions. For example and in one embodiment, a search domain would return a raw, local, and/or global score for each query completion. Performing the multi-domain query completion is further described in FIGS. 3-6.

Instead of returning the query completions determined by the search network 108 to the device that provided the query prefix, the search network 108 uses one or more of the query completions to determine a set of relevant query results over multiple search domains. In one embodiment, using the query completions to determine a set of relevant query results is performed without an indication from the user as to which of these query completions to use to determine the relevant results. In this embodiment, as the user inputs a string into the search input field, the search network 108 processes the string and returns relevant results to the user. In one embodiment, the search network 108 uses one or more of the determined query completions to find and rank query results for those query completions. In one embodiment, the search network 108 searches over the multiple search domains that are available to the search network 108. In this embodiment, the search network 108 receives from each search domain a set of results for query completion. For each of these results, the search network 108 additionally receives a set of scores that characterizes that result. In one embodiment, the scores can include scores determined by the search domain the provided the result, another metric, and/or a signal that characterizes the query completion that was used to provide the result as described below in FIG. 7. In one embodiment, the signal is based on a vocabulary characterization of the query completion using a knowledge base. In one embodiment, the vocabulary characterization determines what type of query completion is being used for the multi-domain query search. Performing a multi-domain query search to determine a set of relevant results is further described in FIGS. 7 and 13-15 below.

Figure 2:
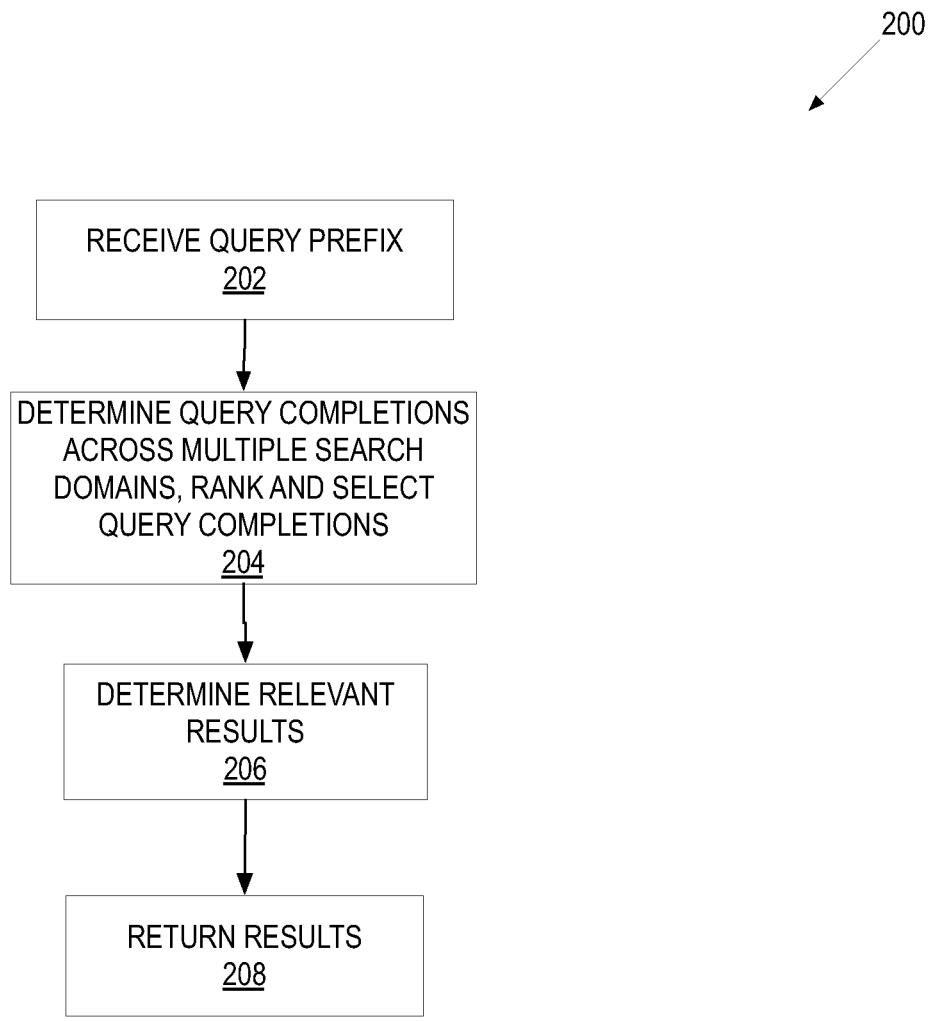
FIG. 2 is flowchart of one embodiment of a process to determine query completions and relevant results based on an input query prefix.

FIG. 2 is flowchart of one embodiment of a process 200 to determine query completions and relevant results based on an input query prefix. In FIG. 2, process 200 begins by receiving a query prefix. In one embodiment, the query prefix includes a query prefix string, a location, a device type identifier, an application type identifier, and a locale as described in FIG. 1 above. In this embodiment, the location, device type identifier, application type identifier, and/or locale give a context for the query prefix that the query prefix string was input by the user. At block 204, process 200 determines query completions across multiple search domains and ranks and selects the query completions. In one embodiment, process 200 uses the query prefix to determine a set of query completions from each of the different such domains. For example and in one embodiment, if the query prefix string is 'ap', process 200 would use this query prefix string to determine the set of query completions from the different search domains (e.g., maps, media, wiki, sites, and/or other search domains). In this example, the maps search domain might return a query completion to the city Apache Junction, the media search domain by return a query completion to the music work Appalachian Spring, the wiki search domain might return a query completion to the company Apple, and the sites search domain my return a query completion to the website Apple.com. In one embodiment, process 200 creates the set of query completions if the query prefix string has a minimum number of characters (e.g., four characters).

In addition, process 200 ranks and selects the possible query completions received from the different such domains. In one embodiment, process 200 ranks the possible query completions based on scores determined by the corresponding search domain and weights based on the context of the query prefix. In this embodiment, process 200 selects the set of query completions based on these rankings. In one embodiment, instead of returning the set of query completions back to the user who input the query prefix string used for the great completions, this set of query completions is used to determine a set of relevant results, which are then returned to the user. Determining a set of query completions is further described in FIGS. 3-6 below.

Process 200 determines the set of relevant results at block 206. In one embodiment, process 200 determines the relevant results based on the query completions determined in block 204. In this embodiment, process 200 searches over the multiple search domains that are available to process 200. In this embodiment, process 200 receives from each search domain a set of results for the query completion(s). For each of these results, process 200 additionally receives a set of scores that characterizes that result. In one embodiment, the scores can include scores determined by the search domain the provided the result, another metric, and/or a signal that characterizes the query completion that was used to provide the result as described below in FIG. 7. In one embodiment, the signal is based on a vocabulary characterization of the query completion using a knowledge base. In one embodiment, the vocabulary characterization determines what type of query completion is being used for the multi-domain query search. Determining the set of relevant results is further described in FIGS. 7 and 13-15 below. At block 208, process 200 returns the set of relevant results to the user. In another embodiment, the feedback index can be used as a signal domain to weight results. This embodiment is further described in FIG. 14 below.

Figure 3:
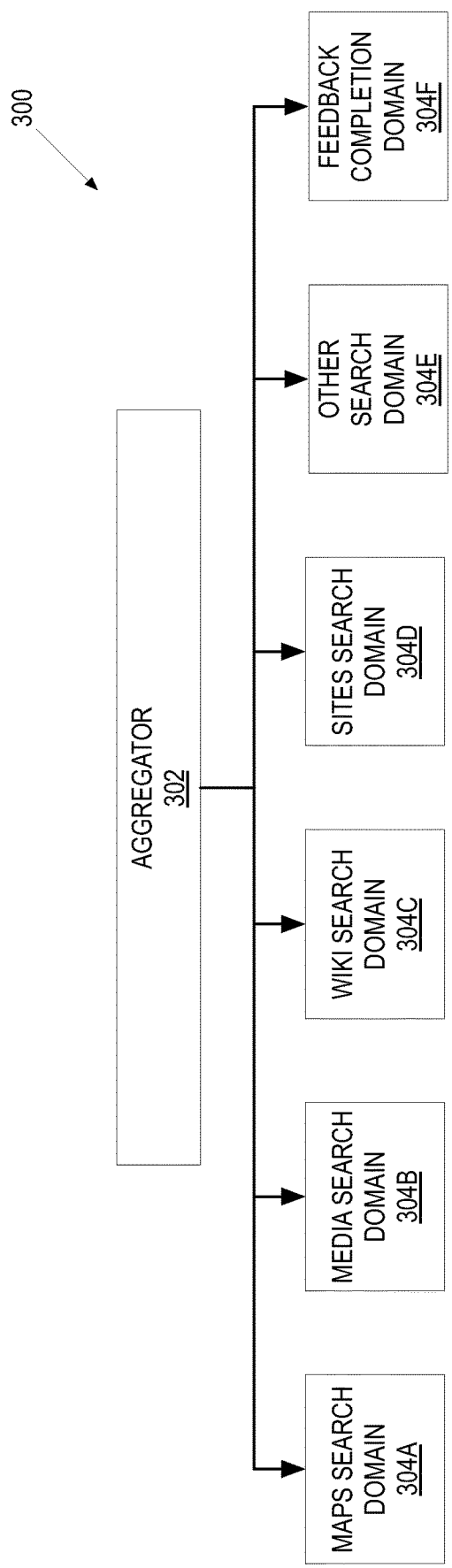
FIG. 3 is a block diagram of one embodiment of an aggregator and multiple search domains.

As described above, process 200 determines query completions and relevant results over multiple search domains. In one embodiment, the query completions and relevant results our aggregated using an aggregator. FIG. 3 is a block diagram of one embodiment of a system 300 that includes an aggregator 302 and multiple search domains 304A-F. In one embodiment, the aggregator 302 receives requests for query completions based on an input query prefix. In response to receiving the input query prefix, the aggregator 302 sends the input query prefix to each of the search domains 304A-F. Each of the search domains 304A-F uses the input query prefix to determine possible query completions in that domain. For example and in one embodiment, the map search domain 304A receives an input query prefix and searches this domain for possible query completions. In one embodiment, the aggregator 302 receives the query completions from each of the search domains, and ranks the received query completions based on the scores for each of the completions determined by the corresponding search domain and weights based on the query prefix context.

In one embodiment, the maps search domain 304A is a search domain that includes information related to a geographical map. In this embodiment, the maps information can include information about places, addresses, places, businesses, places of interest, or other type of information relating to maps. In another embodiment, the maps information can also include information related to places of interest, such as opening hours, reviews and ratings, contact information, directions, and/or photographs related to the place. In one embodiment, the media search domain 304B is a search domain related to media. In one embodiment, the media search domain 304B includes information related to music, books, video, classes, spoken word, podcasts, radio, and/or other types of media. In a further embodiment, the media search domain 304B can include information related to applications that can run on the device, such as device 102, smartphone 114 and tablet 116 as described above in FIG. 1. In one embodiment, the media search domain is a media store that includes different types of media available for purchase (e.g., music, books, video, classes, spoken word, podcasts, radio, applications, and/or other types of media). In one embodiment, the wiki search domain 304C is an online encyclopedia search domain. For example and in one embodiment, wiki search domain 304C can be WIKIPEDIA. In one embodiment, the sites search domain 304D is a search domain of websites. For example and in one embodiment, the sites search domain 304D includes business, governmental, public, and/or private websites such as "apple.com," "whitehouse.gov," "yahoo.com," etc. In one embodiment, the other search domain 304E is a set of other search domains that can be accessed by the aggregator 302 (e.g., a news search domain). One embodiment, the feedback completion domain 304F is a search index that is based on query feedback collected by browsers running on various devices. In one embodiment, the feedback completion domain 304F includes a feedback index that maps queries to results based on the collected query feedback. The feedback index is further described in FIGS. 8-12 below.

Figure 4:
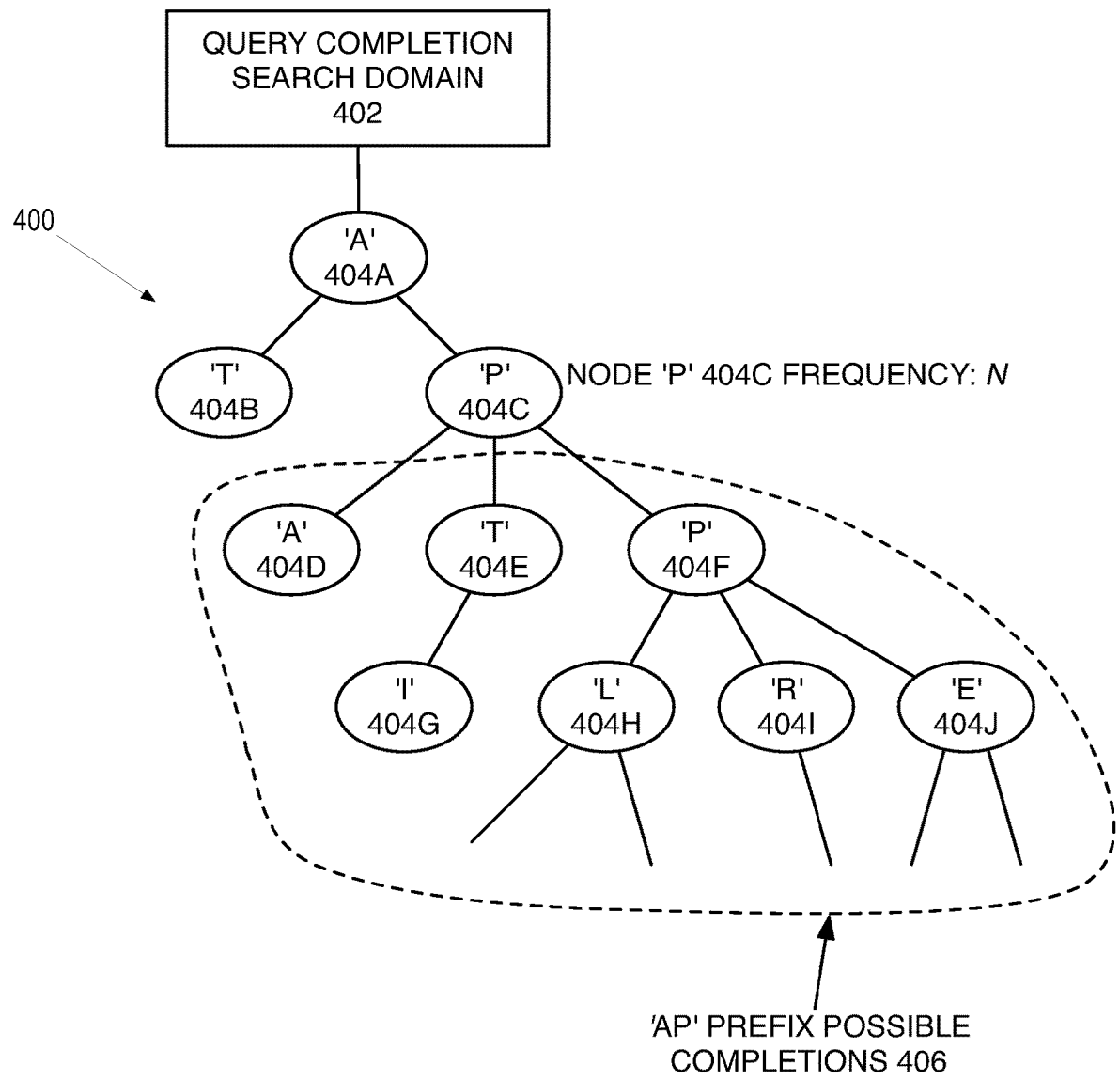
FIG. 4 is an illustration of one embodiment to a query completion search domain.

As described above, each search domain 304A-F includes information that allows each of the search domains to give a set of query completions based on an input query prefix. In one embodiment, each of the search domains includes a query completion tree that is used to determine the query completion as well as determine scores for each of those query completions. FIG. 4 is an illustration of one embodiment to a query completion search domain 402. In FIG. 4, the query completion search domain 402 includes a query completion tree 400 that has nodes 404A-J. In one embodiment, each of the nodes 404A-J represents a character in a respective language. In this embodiment, by following the nodes 404A-J down the tree, different query completions can be represented. For example and in one embodiment, starting at node 404A and following down to node 404C, completions that start with the letters 'ap' can be represented. Each node also includes a frequency, which is the number of times this completion has been matched by an input query prefix. In one embodiment, node 404C has a frequency of N. In this embodiment, the frequency is represented as the raw score that is returned to the aggregator 302 above. In one embodiment, the frequency can be calculated based on logs (e.g., maps or media search domains), pages visited (e.g., wiki search domain), or another source of information. Under node 404C, there are number of possible other query completions. For example and in one embodiment, nodes 404D-F represents the query completions that start with the letters 'apa', 'apt', and 'app'. The total number of possible query completions underneath the node gives an indication of closeness for that query completion represented by that node. If the node has a large number of possible other nodes below it, the query completion represented by that node is unlikely to be a good completion. On the other hand, a node that has relatively few nodes underneath that node, this node may be a good completion. In one embodiment, local score for that node is represented by that node's frequency divided by the number of completions represented by the subtrees below that node. In one embodiment, the equation for the local score is represented by equation (1):

$$\text{local score (node)} = \frac{\text{Frequency(node)}}{\text{Number of completions below the node}} \quad (1)$$

In one embodiment, each query completion tree includes the total number of completions. This value is used to compute the global score for completion (or node). In one embodiment, the equation for the global score is represented by equation (2):

$$\text{global score (node)} = \frac{\text{Frequency(node)}}{\text{Number of completions in the query completion tree}} \quad (2)$$

In one embodiment, the raw, local, and global scores for each query completion are returned to the aggregator by the search domain.

Figure 5:
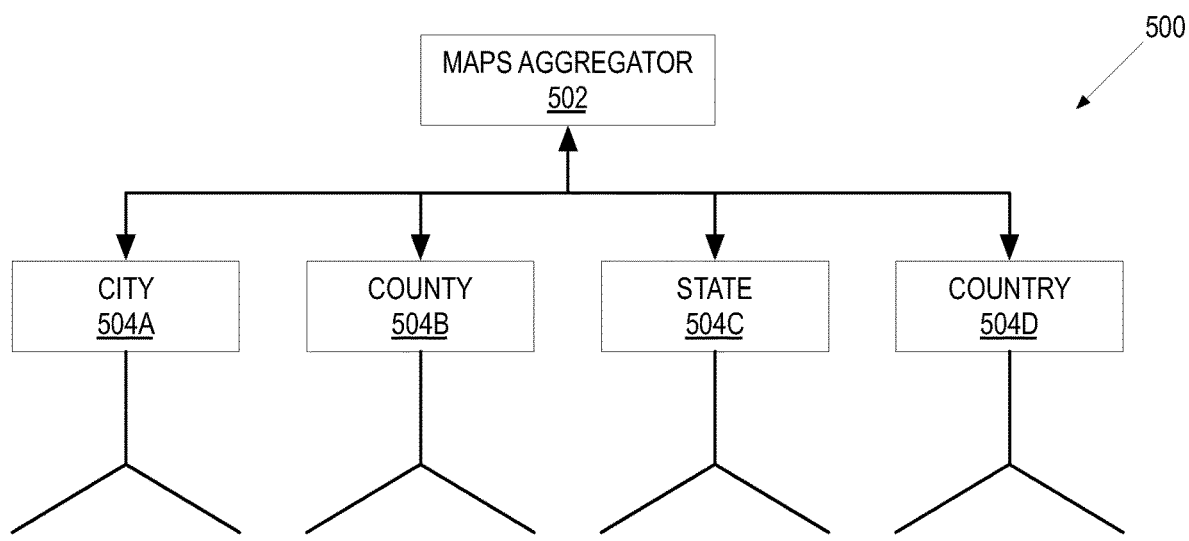
FIG. 5 is an illustration of one embodiment of a maps search domain.

FIG. 5 is an illustration of one embodiment of a maps search domain 500. In FIG. 5, the map search domain 500 includes query completion trees 504A-D for different zoom levels of this domain. In one embodiment, the map search domain 500 includes a query completion tree for the city level 504A, the county level 504B, the state level 504C, and the country level 504D, which are aggregated by the maps aggregator 502. In this embodiment, a determination of query completions for input query prefix is received by the maps aggregator 502, which in turn, determines query completions for that input query prefix at the different zoom levels 504A-D of the map search domain 500. The maps aggregator 502 retrieves the possible query completions from each of the different zoom levels 504A-D, aggregates the query completions, and returns these query completions to the aggregator (e.g., aggregator 302). Thus, the map search domain 500 determines query completions across different zoom levels. In one embodiment, the map search domain 500 includes information about addresses, places, businesses, places of interest, and/or any other information relating to maps. In one embodiment, the map search domain 500 can include directory information, such as a white or yellow pages directory. In one embodiment, the media search domain is organized by storefront, which is based on a combination of device identifier and locale. In this embodiment, there is a query completion tree for each storefront.

Figure 6:
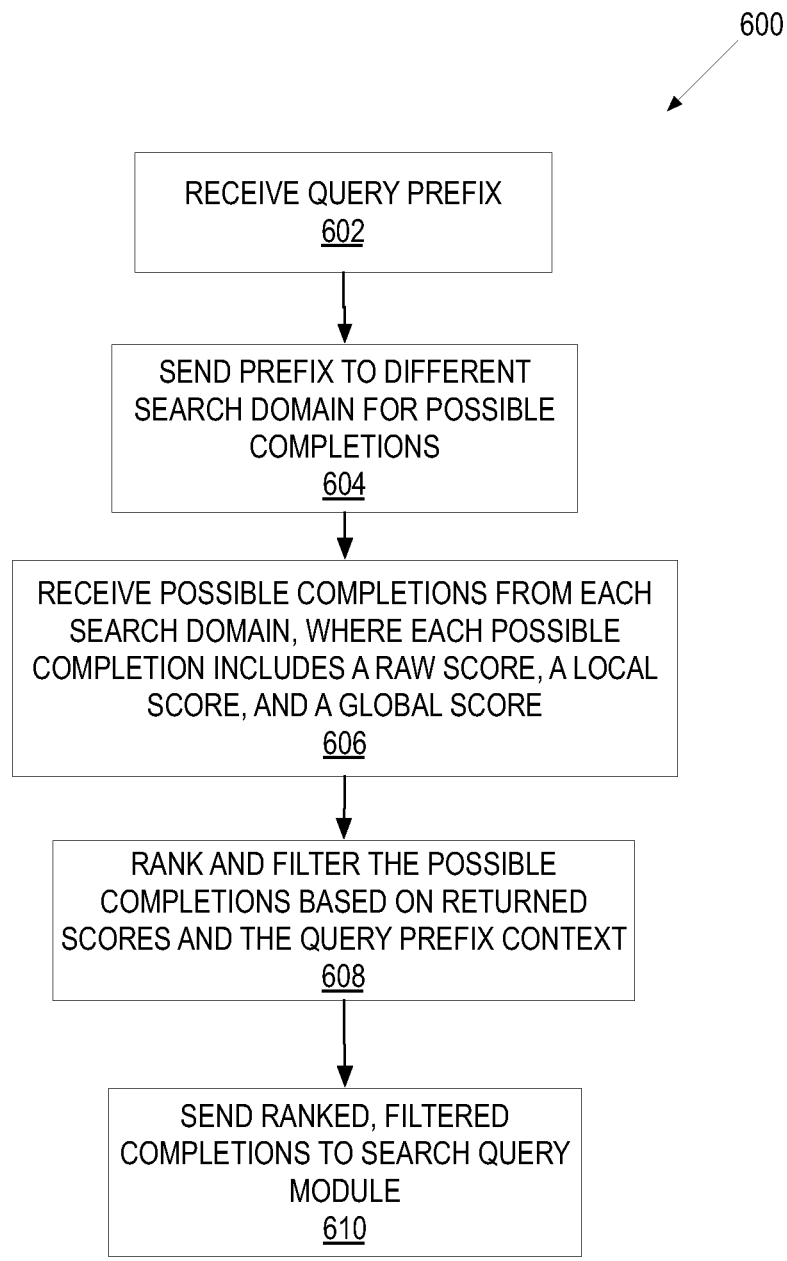
FIG. 6 is a flow chart of one embodiment of a process to determine query completions from multiple search domains.

FIG. 6 is a flow chart of one embodiment of a process 600 to determine query completions from multiple search domains. In one embodiment, aggregator 302 performs process 600 to determine query completions from multiple search domains. In FIG. 6, process 600 begins by receiving a query prefix at block 602. In one embodiment, the query prefix includes a query prefix string in a context as described above in FIG. 2. At block 602, process 600 sends the query prefix to different search domains to determine possible completions. In one embodiment, process 600 sends the query prefix to the maps, media, wiki, sites, and/or other search domains, where each of the search domains determines possible query completions for the input query prefix based on the query completion tree(s) that are available for each of those search domains as described in FIG. 4 above. Process 600 receives the possible query completions from each of the search domains at block 606. In addition to receiving the possible query completions, process 600 also receives a set of scores for each of the possible completions: e.g., a raw, local, and/or global score as described in FIG. 4 above. At block 608, process 600 ranks and filters the possible query completions based on the returned scores and the context of the input query prefix. In one embodiment, process 600 tanks the possible query completions based on the raw, local, and global scores received from the different search domains and the context included with the query prefix. Process 600 additionally filters the possible query completions based on a set of rules. For example and in one embodiment, a filter rule could be that processed 600 filters out possible completions that have a raw score of one or less than some predetermined value. Process 600 sends the ranked, filtered completions to the search query module, where the search query module uses the set of rank filtered query completions to determine a set of relevant results that will be returned to the user at block 610.

Figure 7:
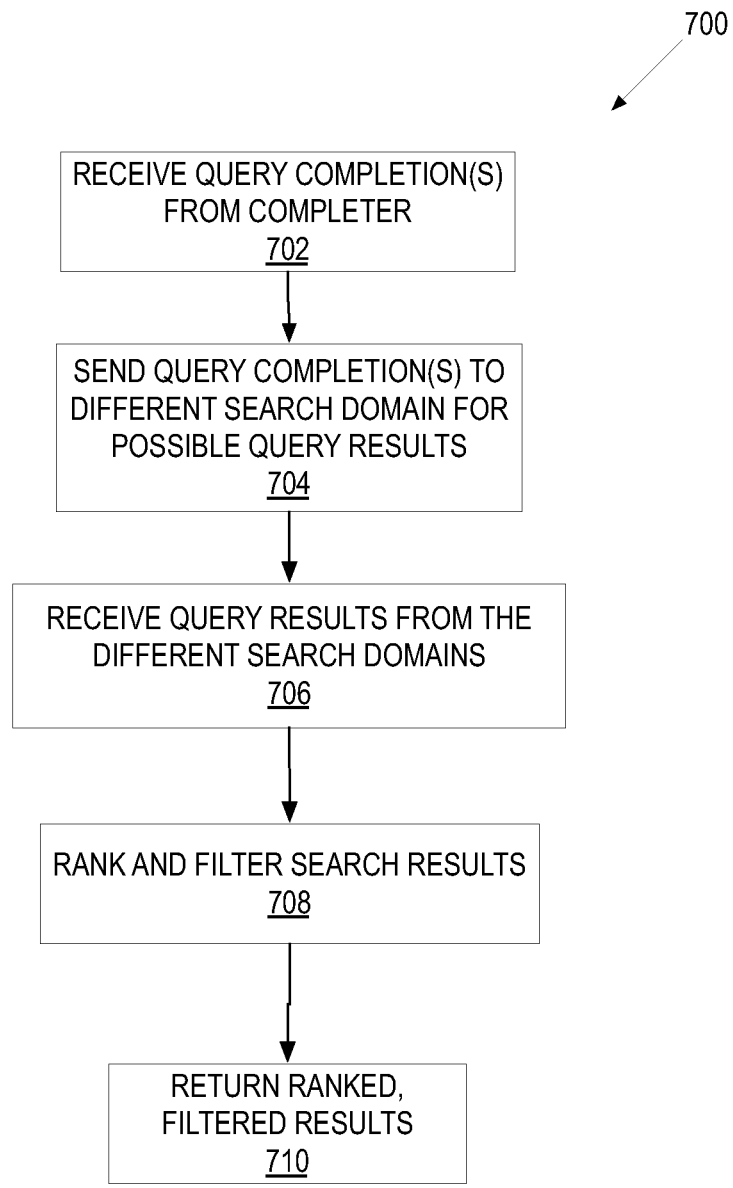
FIG. 7 is a flow chart of one embodiment of a process to determine relevant results over multiple search domains from a determined query completion.

As described above, the query completions determined by process 600 are used to determine relevant results without sending these completions back to the user. FIG. 7 is a flow chart of one embodiment of a process 700 to determine relevant results over multiple search domains from a determined query completion. In one embodiment, the federator 824 performs process 700. In FIG. 7, process 700 receives the query completions from the completer at block 702. In one embodiment, the received query completions are the completions determined by process 600 in response to receiving a query prefix. At block 704, process 700 sends the query completions to the different search domains to determine possible relevant results. In one embodiment, each of the search domains uses the received query completions to determine relevant results for that search domain. At block 706, process 700 receives the query results from the different search domains. In one embodiment, process 700 receives the results and the scores associated with each result that are computed by the relevant search domain.

Process 700 ranks and filters the search results at block 708. In one embodiment, process 700 ranks the search results based on scores returned by each of the searched domains for the search results and other factors. In this embodiment, the scores from the different domains can be scored based on domain-dependent scores, query independent scores, and query dependent scores. In one embodiment, each of the different search domains can provide specific data that is used to rank the returned results. For example and in one embodiment, the maps search domain can provide a variety of query independent information to rank the results: number of online reviews, average review score, distance from the user (e.g., based the query prefix location information), if the result has a Uniform Resource Locator (URL) associated with the result (e.g., if the result is a business location, if the business has a URL reference a website or other social media presence), and/or the number of click counts. As another example and another embodiment, the media search domain can provide other type of information for scoring: media rating count, age of the media, popularity, decayed popularity, and/or buy data by result. In a further example and embodiment, the wiki search domain can provide information regarding page views, edit history, and number of languages that can be for ranking. Other search domain can provide scoring metrics such as number of citations and age.

In one embodiment, process 700 receives a set of scores from each search domain and uses these scores to determine an initial score for each of the results. Process 700 applies a signal domain to each of the results. In one embodiment, a signal domain is a query completion characterization. In this embodiment, process 700 characterizes each of the query completions and uses this query completion characterization to rank the results. For example and in one embodiment, process 700 performs a vocabulary characterization utilizing a knowledge base to determine what a type for the query completion. In this example, a query completion type indicates whether the query completion is determining a person, place, thing, and/or another category. For example and one embodiment, process 700 could determine that a query completion is being used to determine a place. In this example, because the query completion is used to determine a place, the query results from the maps search domain would be weight (and ranked) higher in the ranking of the search results. The query completion characterization is further described in FIGS. 13-15 below.

In another embodiment, process 700 applies boosts to each of the result scores. In this embodiment, process 700 applies a query deserves freshness to each of the results. In one embodiment, query deserve freshness means that if there are recent spikes or peaks in the number of counts for that results, this result is a "fresh" result, which could be boosted. A result with a count that fluctuates around a baseline over time would not be a "fresh" result and would not be boosted. In one embodiment, the counts are based on analysis of a social media feed (e.g., Twitter, etc.).

For example and in one embodiment, if the query completion was "puppy love" and four results were returned: (1) the song "Puppy Love" from the media search domain; (2) a business called "Puppy Love Dogs" from the maps search domain; (3) a news article referring to a puppy love commercial; and (4) a wiki entry called "Puppy Love". In this embodiment, there is initial scoring of each result based on search domain dependent metrics: {age, rating, and raw score} from the media search domain; {distance from user, has URL, number of reviews, average review} from the maps search domain; {age, news score, trackback count} from the news domain; and {page rank, raw score} from the wiki search domain. Each of the search domain provides its own scoring to process 700. In this example, the scoring of each result could be initially rank as wiki result>media result>news result>maps result. Process 700 further applies a signal domain to each of the results. In this example, the query "puppy love" is characterized as a song and possibly a place. Applying this characterization would boost the media store result and, to a lesser extent, the maps result. After applying the characterization boosts, the results scoring may be ranked wiki result>media result (but closer in score)>maps result>news result. In addition, process 700 applies query deserved boosts to the results. For example, because it is two days after the initial airing of the "Puppy Love" commercial, there is a boost in the counts for this commercial. Thus, the "Puppy Love" result would get a query deserves freshness boost. In this example, the news result "Puppy Love" would get a big boost so that the results would rank as news result>wiki result>media result>maps result.

In one embodiment, process 700 additionally filters the search results. In this embodiment, process 700 removes results based on certain rules. For example and in one embodiment, process 700 may remove results that below a certain overall score. Alternatively, process 700 can filter results based on another criteria (e.g., Poor text match to query, low click-through rate, low popularity, results with explicit content and/or profanity, and/or a combination thereof). At block 710, process 700 returns the ranked, filtered results to the user.

Figure 8:
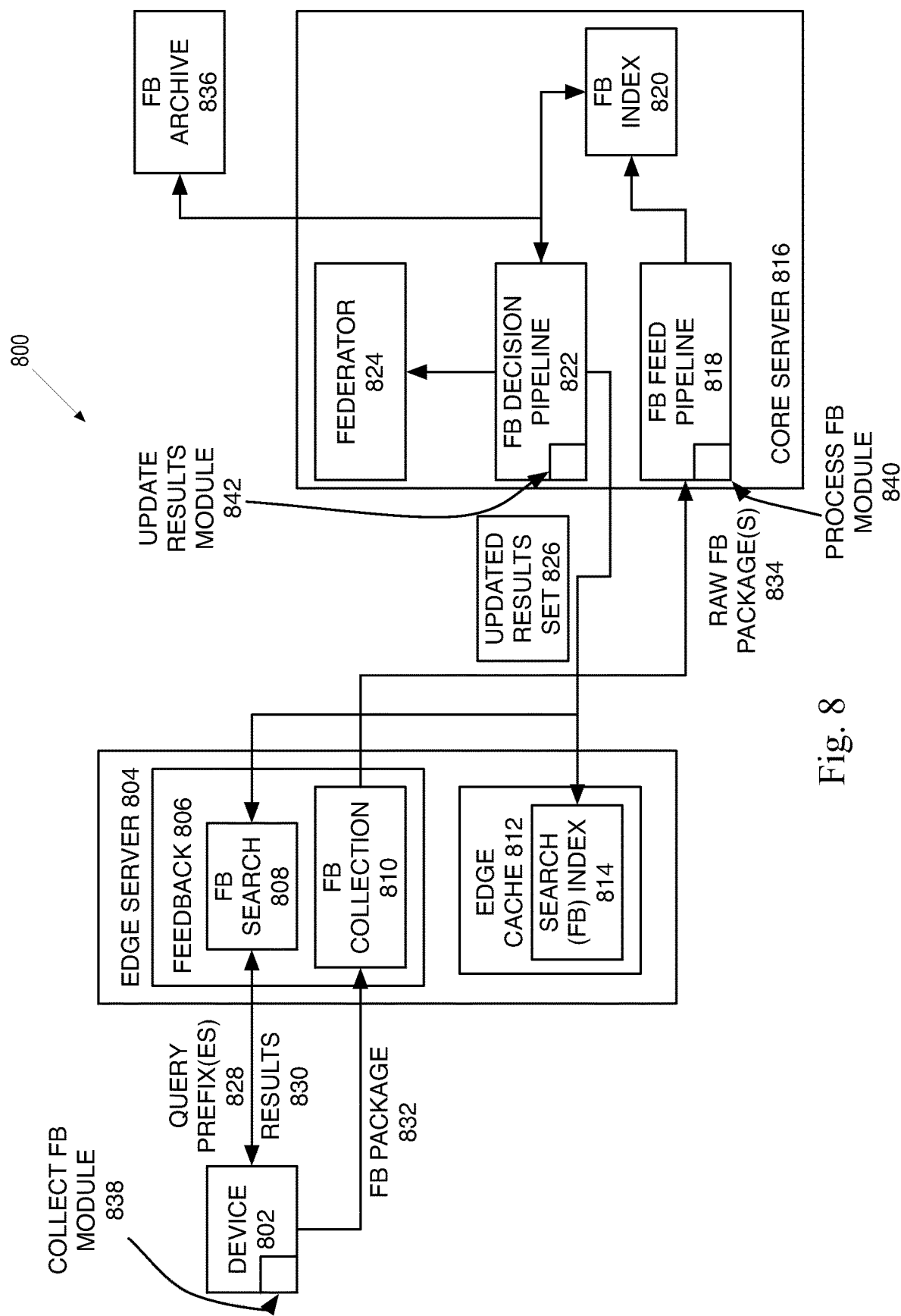
FIG. 8 is a block diagram of one embodiment of a system that incorporates user feedback into a feedback search index.

FIG. 8 is a block diagram of a system 800 that incorporates user feedback into a search index. In FIG. 8, the system 800 includes a device 802 that sends query prefix(es) 828 to an edge server 804, which in turn returns query results 830 back to the device. In addition, the edge server 804 is coupled to a core server 816. In one embodiment, the device 802 sends the query prefix(es) 828 to the edge server as the user enters in the query prefix. For example and in one embodiment, if the user types in the query prefix "apple," a query prefix is generated for "a," "ap," "app," "appl," and "apple" and sent to the edge server 804 as the user enters each character. In addition, for each query prefix 828 sent to the edge server 804, the edge server 804 returns relevant results 830 to the client. For example and in one embodiment, the edge server would return relevant results for the query prefixes 828 "a," "ap," "app," "appl," and "apple" as the user enters each character. In one embodiment, the edge server can also perform the query completion. In one embodiment, the device 802 further collects feedback regarding a user's search session, collects this feedback into a feedback package 832, and sends the feedback package to the edge server. Collecting and sending of the feedback is further described in FIG. 10 below. In one embodiment, the device 802 includes a collect feedback module 838 to collect and send feedback.

In one embodiment, the edge server 804 includes a feedback module 806 that further includes a feedback search module 808 and feedback collection module 810. In one embodiment, the feedback search module 808 performs a search for each of the query prefix(es) 828 based on a feedback index 814 stored on an edge cache 812 of the edge server 804. In this embodiment, as the user enters a query prefix 828, a new set of relevant results 830 is returned to the device 802 using the feedback search module 808 and the feedback search index 814. In one embodiment, a feedback search index is an index that incorporates the user's feedback into the search index. In this embodiment, the feedback search index is a results cache that is used to quickly serve results 830 back to the device. In one embodiment, the feedback search index is a citation search index and is further described with reference to FIG. 11 below. In one embodiment, the feedback collection 810 collects the feedback packages sent from device 802 and forwards the feedback package to the core server 816.

In one embodiment, the core server 816 includes a feedback feed pipeline 818, feedback decision pipeline 822, feedback index 820, and federator 824. In one embodiment, the feedback feed pipeline 818 receives the raw feedback packages 834 from the edge server 804 and converts each of these raw feedback packages 834 into entries for the feedback index 820. In one embodiment, the feedback feed pipeline 818 converts each of the raw feedback packages into a set of index entries with the format of <query, result, render counts, engagement counts, abandonment counts>, where query is the input query and context information such as, device type, application, locale, and geographic location, result is the render result, render counts is the number of times the result is rendered for that query, engagement counts is the number of times the result is engaged for that query, and abandonment counts is the number of times that result is abandoned. In this embodiment, these index entries are added to the feedback index 820. Updating a feedback index with the raw feedback packages is further described in FIG. 11 below. In one embodiment, the feedback index 820 is a search index that incorporates the user's feedback. The feedback feed pipeline 818 further includes a process feedback module 840 that updates a feedback index with the raw feedback packages.

In one embodiment, the feedback decision pipeline 822 updates a results set using the feedback index 820. In one embodiment, a results set is a map between a set of queries and results. In this embodiment, the feedback decision pipeline 822 runs a set of queries against the feedback index 820 to determine an updated results set. In this embodiment, the updated results set is sent to the federator 824. The feedback decision pipeline 822 additionally sends the updated results set 826 to the edge server 804. The updated results set 826 includes the results for the set of queries that are determined using the updated feedback index 820. In one embodiment, the feedback decision pipeline 822 includes an update results module 842 that updates the results set. Updating the results set is further described in FIG. 12 below. In one embodiment, the feedback decision pipeline 822 additionally sends the updated results set to a feedback archive 836 that stores the updated results set 826. In one embodiment, the federator 824 performs a multi-domain search using completed queries as described in FIGS. 13-15 below.

Figure 9:
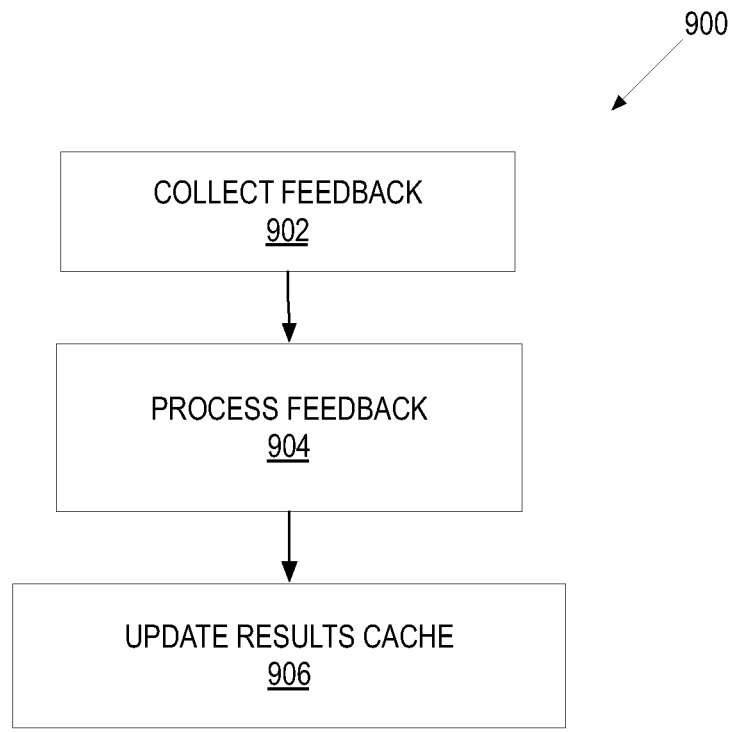
FIG. 9 is a flow chart of one embodiment of a process to incorporate user feedback into a citation search index.

As described above, the search network captures user feedback with respect to a user's search session and uses this feedback to build a search feedback index. FIG. 9 is a flow chart of one embodiment of a process 900 to incorporate user feedback into a citation search index. In FIG. 9, process 900 begins by collecting the user feedback for a user's search session. In one embodiment, process 900 start collecting feedback at a device that received the query results in response to a query prefix that was sent to the search network. In this embodiment, process 900 collects the feedback by detecting an initial render event (or another event (e.g., begin input of a query prefix) and determining the user's interactions in the search session. In one embodiment, a user interaction can be maintaining focus on a website referenced by a results, clicking on a link or other reference on that website, or another type of interaction. In one embodiment, a search session is a set of events initiated by the user beginning an input of a query prefix, tracking the user's actions over a rough period of time (e.g., 15 minutes). In one embodiment, process 900 records the query prefix sent out, the relevant results that are rendered for the user, if the user engages with any of these render results ("engagement events"), and if the user abandons the rendered results ("abandonment events"). In one embodiment, process 900 records if the user engages in alternate search options.

In one embodiment, an engagement event occurs if the user interacts with one of the rendered results presented to the user. For example and in one embodiment, the user could click on a link that is presented for one of the rendered results. In another example, the user could click on the link and spend a time greater than a predetermined time interacting with the object (e.g., a website) referenced by that link (e.g., interacts with the referenced object for more than 60 seconds). In this example, the user may received results directed towards a query search for the current U.S. President and click on a link that references a web page describing the latest presidential speech. If the user interacts with the website for more than a predetermined time (e.g., 60-90 seconds), process 900 would determine that the user engaged with the result represented by that link. Thus, this would be an engagement event for this result. In one embodiment, hovering over a link can be recorded as engagement. In another embodiment, a user can also observe a displayed result for a certain period of time. In this embodiment, depending on the type of result, and the action following the period of time, an action otherwise recorded as abandonment may be recorded as engagement instead, or vice versa. For example and in one embodiment, if a user queries for the "population of china" and is displayed a result, and the user pauses for 10 seconds before deleting the query, this event maybe recorded as an engagement instead of an abandonment event.

In another embodiment, the user may ignore or abandon results rendered for the user. For example and in one embodiment, if a user clicks on a link presented for one of the rendered results, but navigates away from that website within a predetermined time (e.g., less than 60-90 seconds), process 900 determines that this is an abandonment event for that result. In one embodiment, there are other types of abandonment events: continuing to type more characters (extending the query prefix); changing focus to another window or application; deleting the query; backspacing one or more characters or otherwise editing the query; engaging with anything other than what was presented as a result can be recorded as an abandonment of that result. In one embodiment, the user's actions are recorded along with time intervals spent by the user, which can change the interpretation of what would otherwise be an abandonment to an engagement or vice versa.

In one embodiment, a user's search session can end after a predetermined time, whether in length of user session, time of inactivity, or some other metric. In response to a search session ending, process 900 assembles the collected events for this search session into a feedback package that is sent to the search network. Collecting the feedback is further described in FIG. 10 below.

At block 904, process 900 processes the received feedback that is included in the feedback package. In one embodiment, process 900 converts the received feedback package into an entry for a feedback search index. In one embodiment, the feedback search index is a search index that incorporates the users feedback into scoring results. For example and in one embodiment, each engagement events for a (query, result) pair promotes that result for the corresponding query. In this example, if a user engages with a result for a particular query, then a future user may also engagement with this result for the same query. Thus, in one embodiment, the result for this query would be returned and ranked higher for a future user having the same query. Conversely, if a user abandons a result for a particular query, then a future user may also abandon this same result for the same query. Thus, in one embodiment, the result for this query may be returned and ranked lower for a future user having the same query.

In one embodiment, process 900 converts the received feedback package into a feedback search index entry that has the format of <query, result, render counts, engagement counts, abandonment counts>, where query is the input query and context information such as, device type, application, locale, and geographic location, result is the render result, render counts is the number of times the result is rendered for that query, engagement counts is the number of times the result is engaged for that query, and abandonment counts is the number of times that result is abandoned. In one embodiment, process 900 updates this feedback index entry in the feedback search index. In a further embodiment, each feedback package includes also unique source identifiers that may include user identifiers, device identifiers, or session identifiers, with or without methods to obfuscate identity to preserve privacy, where updating the feedback index entry append to the index in the form of a citation index, with the unique source identifiers being the source of the feedback citations. The feedback index can then be queried to provide results and weightings that are personalized or customized to individuals or groups of users. Processing the received feedback is further described in FIG. 11 below.

Process 900 updates a results cache at block 906. In one embodiment, the results cache is a cache that maps queries to results, which can be used to quickly return results for a user query. In one embodiment, the results cache is stored in an edge server that is close in proximity to a user's device that can be used to serve one or more results prior to performing a query search (e.g., an edge server that is geographically closer to the client than other edge servers). In one embodiment, process 900 updates the results by running a set of queries using the updated feedback search index to determine a set of results for these queries. The updated results are sent to each of the results caches stored on the edge servers. Updating the results cache is further described in FIG. 12 below.

Figure 10:
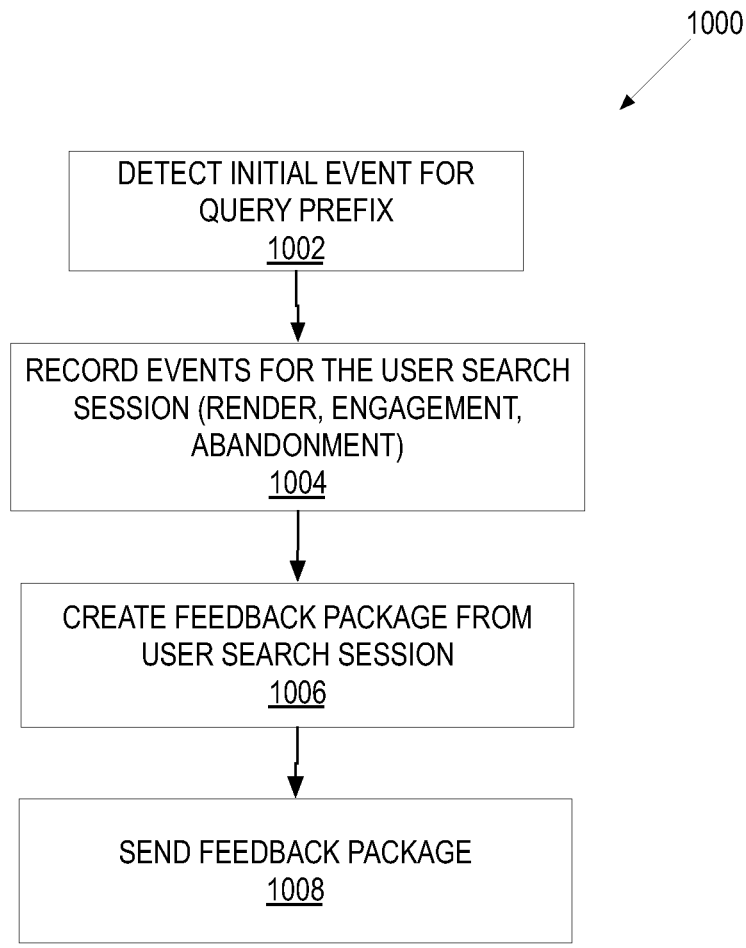
FIG. 10 is a flow chart of one embodiment of a process to collect user feedback during a user search session.

FIG. 10 is a flow chart of one embodiment of a process 1000 to collect user feedback during a user search session. In one embodiment, process 100 is performed by a collect feedback module to collect user feedback during a user search session, such as the collect feedback module 838 as described in FIG. 8 above. In FIG. 10, process 1000 begins by detecting an event that triggers the feedback collection. In one embodiment, the initial event can be start of an input for the query prefix string, of another type of event. In one embodiment, if the user has participated in a previous search session over a period of time (e.g., 15 minutes), this start of an input for the query prefix string marks the start of a new user search session and starts the recording of the user feedback. As described above, a search session is a set of events initiated by the user beginning an input of a query prefix, tracking the user's actions over a rough period of time (e.g., 15 minutes).

At block 1004, process 1000 records the events associated with the user search session. In one embodiment, process 1000 records render, engagement, and abandonment events. In one embodiment, a render event is the relevant results that are rendered for the user in response to a user entering a query prefix or complete query. In one embodiment, process 1000 records the render event by recording the results presented for each query prefix or complete query. In addition, process 1000 records engagement events at block 1004. In one embodiment, an engagement event is an event that occurs if the user interacts with one of the rendered results presented to the user. For example and in one embodiment, the user could click on a link that is presented for one of the rendered results. In another example, the user could click on the link and spend a time greater than a predetermined time interacting with the object (e.g., a website) referenced by that link (e.g., interacts with the referenced object for more than 60 seconds). In this example, the user may receive results directed towards a query search for the current U.S. President and click on a link that references a web page describing the latest presidential speech. If the user interacts with the website for more than a predetermined time (e.g., 60-90 seconds), process 1000 would determined that the user engaged with the result represented by that link. Thus, this would be an engagement event for this result.

In a further embodiment, process 1000 can record abandonment events, where an abandonment event is an event where the user may ignore or abandon results rendered for the user. For example and in one embodiment, if a user clicks on a link presented for one of the rendered results, but navigates away from that website within a predetermined time (e.g., less than 60-90 seconds), process 900 determines that this is an abandonment event for that result. In one embodiment, a user navigates away by closing a tab or window presenting the website, changing focus to another application, or some other action that indicates that the user is not interacting with the presented website.

At block 1006, process 1000 creates a feedback package from the recorded events of the user's search session. In one embodiment, a user's search session ends by based on a predetermined time since the initial search session event (e.g., 15 minutes) or can be a predetermined time of user inactivity with regards to the user search session. For example and in one embodiment, if the user has no activity or is not interacting with the results or other types of objects referenced by one of the results over a predetermined amount of time (e.g., 10 minutes), the user's search session would end. In one embodiment, in response to the ending of a user's search session, process 1000 would collect the recorded events and create a feedback package from this user search session. In one embodiment, the feedback package includes a set of results rendered for the user, the queries associated with those results, the engagement events where the user engaged a results of a query, and the abandonment events where the user abandoned results rendered for the user, where each of the abandoned events is associated with a query. Process 1000 sends this feedback package to the search network at block 1008. In one embodiment, the client sends the feedback package to an edge server, where the edge server forwards the feedback package to the core server for processing.

Figure 11:
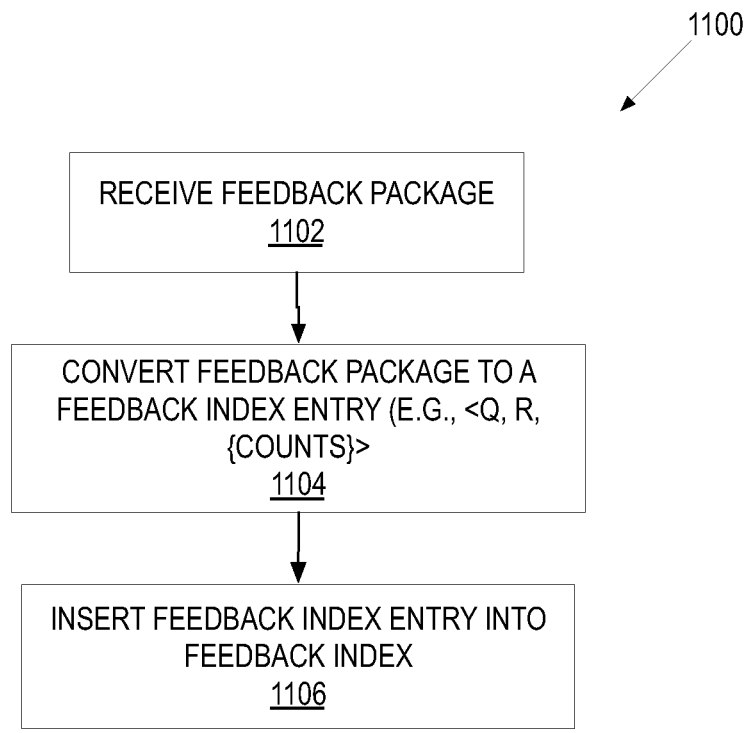
FIG. 11 is a flow chart of one embodiment of a process to incorporate user feedback during into a feedback index.

FIG. 11 is a flow chart of one embodiment of a process 1100 to incorporate user feedback during into a feedback index. In one embodiment, the process feedback module performs process feedback module, such as the process feedback module 840 as described in FIG. 8 above. In FIG. 11, process 1100 begins by receiving the feedback package at block 1102. In one embodiment, the feedback package is the feedback package of a user's search session as described in FIG. 10 above. At block 1104, process 1100 converts the feedback package into one or more feedback index entries. In one embodiment, a feedback index entry is the number of events recorded for a particular query, result pair. For example and in one embodiment, a feedback index entry includes <query, result, render counts, engagement counts, abandonment counts>, where query is the input query and context information such as, device type, application, locale, and geographic location, result is the render result, render counts is the number of times the result is rendered for that query, engagement counts is the number of times the result is engaged for that query, and abandonment counts is the number of times that result is abandoned.

At block 1106, process 1100 inserts the feedback index entry into a feedback index. In one embodiment, a feedback index is a search index that incorporates the user feedback into a search index. In one embodiment, the feedback index is a citation index, where an engagement event is a positive citation for the result and an abandonment event is a negative citation for that result. In one embodiment, a citation search index is described in U.S. patent application Ser. No. 12/628,791, entitled "Ranking and Selecting Entities Based on Calculated Reputation or Influence Scores", filed on Dec. 1, 2009 and is incorporated herein. In one embodiment, if the there is an entry in the feedback index with the same query, result pair, process 1100 updates this entry with the number of event counts.

Figure 12:
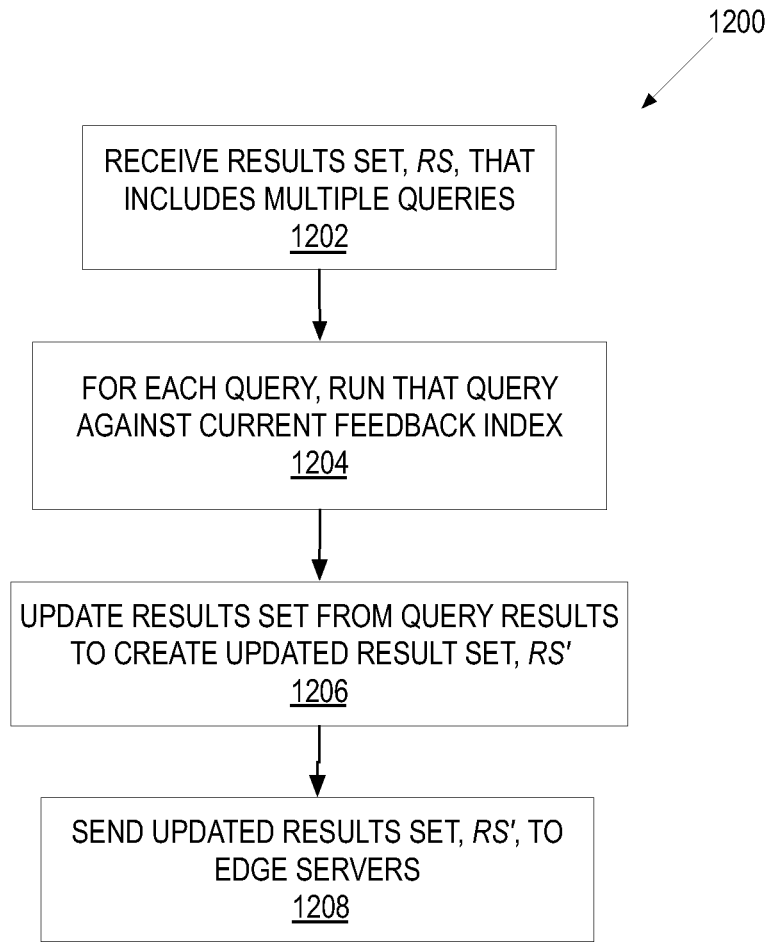
FIG. 12 is a flow chart of one embodiment of a process to use the user feedback to update a results cache.

As described above, the user feedback incorporated the feedback index can be used to update a results cache. FIG. 12 is a flow chart of one embodiment of a process 1200 to use the user feedback to update a results cache. In one embodiment, an update results module performs process 1200 to update a results cache, such as the update results module 842 as described in FIG. 8 above. In FIG. 12, process 1200 begins by receiving a results set RS that include multiple queries. In one embodiment, the results set is a map between a set of queries and results. This results set can be used for a result cache to quickly return relevant results for query prefixes as described in FIG. 8 above. In one embodiment, the results sets is generated by a search index that does not include user feedback In another embodiment, the results sets is generated by a previous feedback index that incorporates previous user feedback.

At block 1204, process 1200 runs each query from the results set RS against the current feedback index. Process 1200 uses the results from the run queries in block 1204 to create an update results set RS' at block 1206. In one embodiment, the results set RS' is a feedback weighted results set, where the results for a query that have a greater engagement events are weighted higher in the feedback index and results for that query that have greater abandonment events are weighted lower in the feedback index. For example and in one embodiment, if a query Q in results set RS, would have results ranked as $R_1$, $R_2$, and $R_3$, and in the updated feedback index has the these results for Q as $R_1$ having 20 engagement events and 50 abandonment events, $R_2$ having 100 engagement events and 2 abandonment events, and $R_3$ having 50 engagement events and 10 abandonment events, running the query Q against the updated feedback index may return the ranked results as $R_2$, $R_3$, and $R_1$. Thus, in one embodiment, using the feedback index will alter the ranking of the results in the updated results set RS'. In another embodiment, the relevant results filter may have a rule that for a result to be presented, the result may need at x number of engagement events or no more than y abandonment events. Thus, in this embodiment, using the feedback index may alter which results are presents and which are not. Process 1200 sends the updated results set RS' to each of the edge servers at block 1208. In one embodiment, process 1200 sends the updated results set RS' from the core server 816 to the edge server 804 as described in FIG. 8 above.

Figure 13:
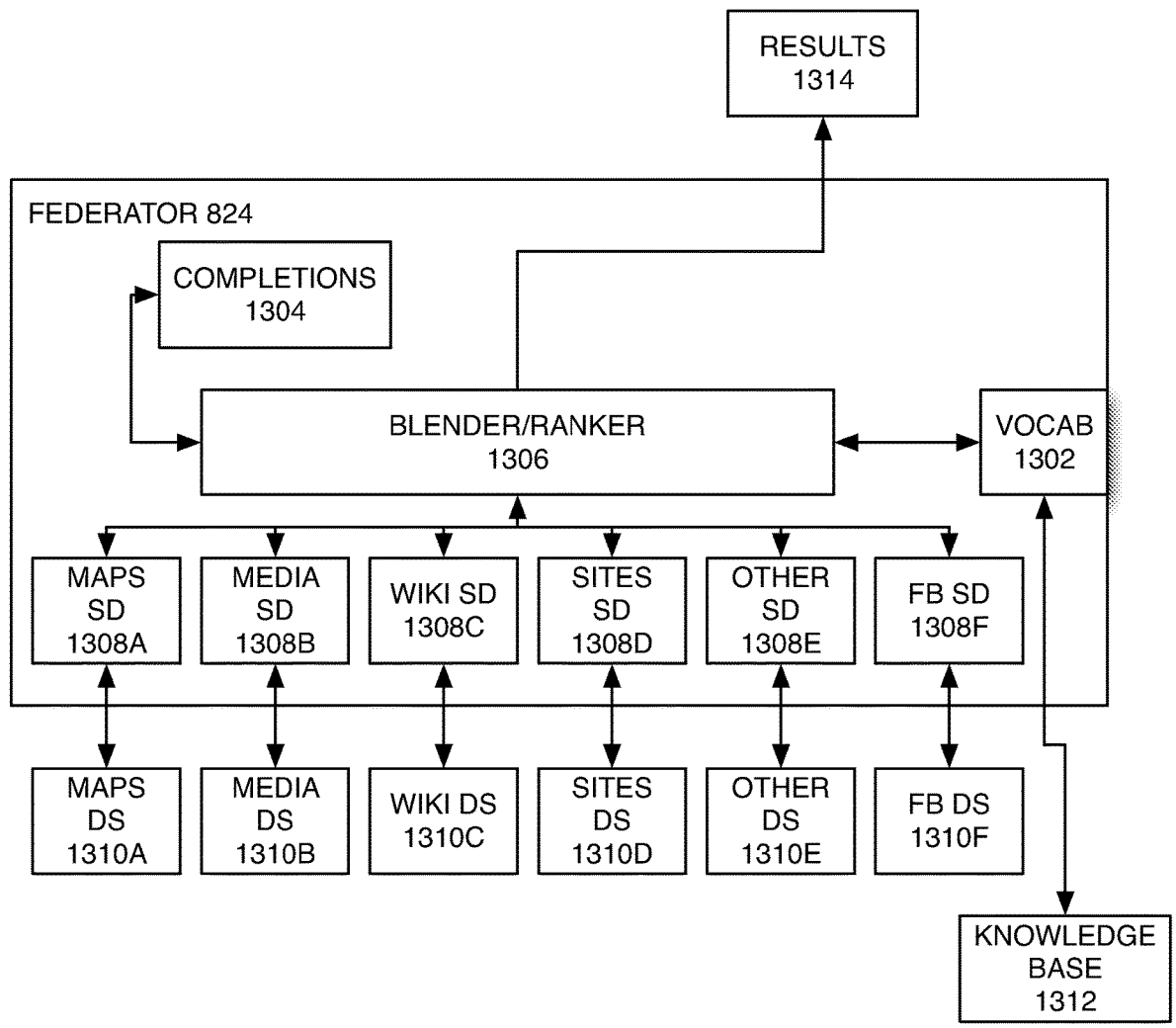
FIG. 13 is a block diagram of one embodiment of a federator that performs a multi-domain search using a characterized query completion.

FIG. 13 is a block diagram of one embodiment of a federator 824 that performs a multi-domain search using a characterized query completion. In one embodiment, the federator includes completions module 1304, blender/ranker 1306, multiple search domains 1308A-F, and vocabulary service 1314. In one embodiment, the completions module 1304 determines the query completions for each of the query prefixes as described in FIG. 6 above. The determined query completions are forwarded to the blender/ranker 1306, which uses the query completions to perform a multi-domain search for relevant results using search domains 1308A-F as described in FIG. 7 above. In one embodiment, the search domains 1308A-F are the search domains as described in FIG. 3 above. For example and in one embodiment, the maps search domain 1308A is search domain that includes information related to a geographical map as described in FIG. 3 above. The maps search domain 1308A queries information from a maps data source 1310A. The media search domain 1308B is a search domain related to media as described in FIG. 3 above. The media search domain 1308B queries information from a media data source 1310B. The wiki search domain 1308C is an online encyclopedia search domain as described in FIG. 3 above. The wiki search domain 1308C queries information from a wiki data source 1310C. The sites search domain 1308D is a search domain of websites as described in FIG. 3 above. The sites search domain 1308D queries information from a sites data source 1310D. The other search domain is a set of other search domains that can be accessed by the blender/ranker 1306 as described in FIG. 3 above. The other search domain 1308E queries information from other data source(s) 1310E. In one embodiment, the feedback search domain 1308F a search index that is based on query feedback collected by browsers running on various devices as described in FIG. 3. The feedback search domain 1308 queries information from the feedback data source 1310F (e.g., the feedback search index).

In addition, the blender/ranker 1306 receives the results from the multiple search domains 1308A-F and ranks these results. In one embodiment, the blender/ranker 1306 characterizes each of the query completions using a vocabulary service 1302 that determines what type of search is being performed. For example and in one embodiment, the vocabulary service 1302 can determine if the search is for a person, place, thing, etc. In one embodiment, the vocabulary service 1302 uses a knowledge base 1312 that maps words or phrases to a category. In this embodiment, characterizing the query completion is used to weight results returned by the search domains 1308A-F. For example and in one embodiment, if the query completion is characterized to be a search for a place, the results from the maps search domain can be ranked higher as well as a wiki entry about this place. As a further example, if the query completion is indicated to be about an artist, the media search domain results can be ranked higher. Weighting the results is further described in FIG. 14 below.

Figure 14:
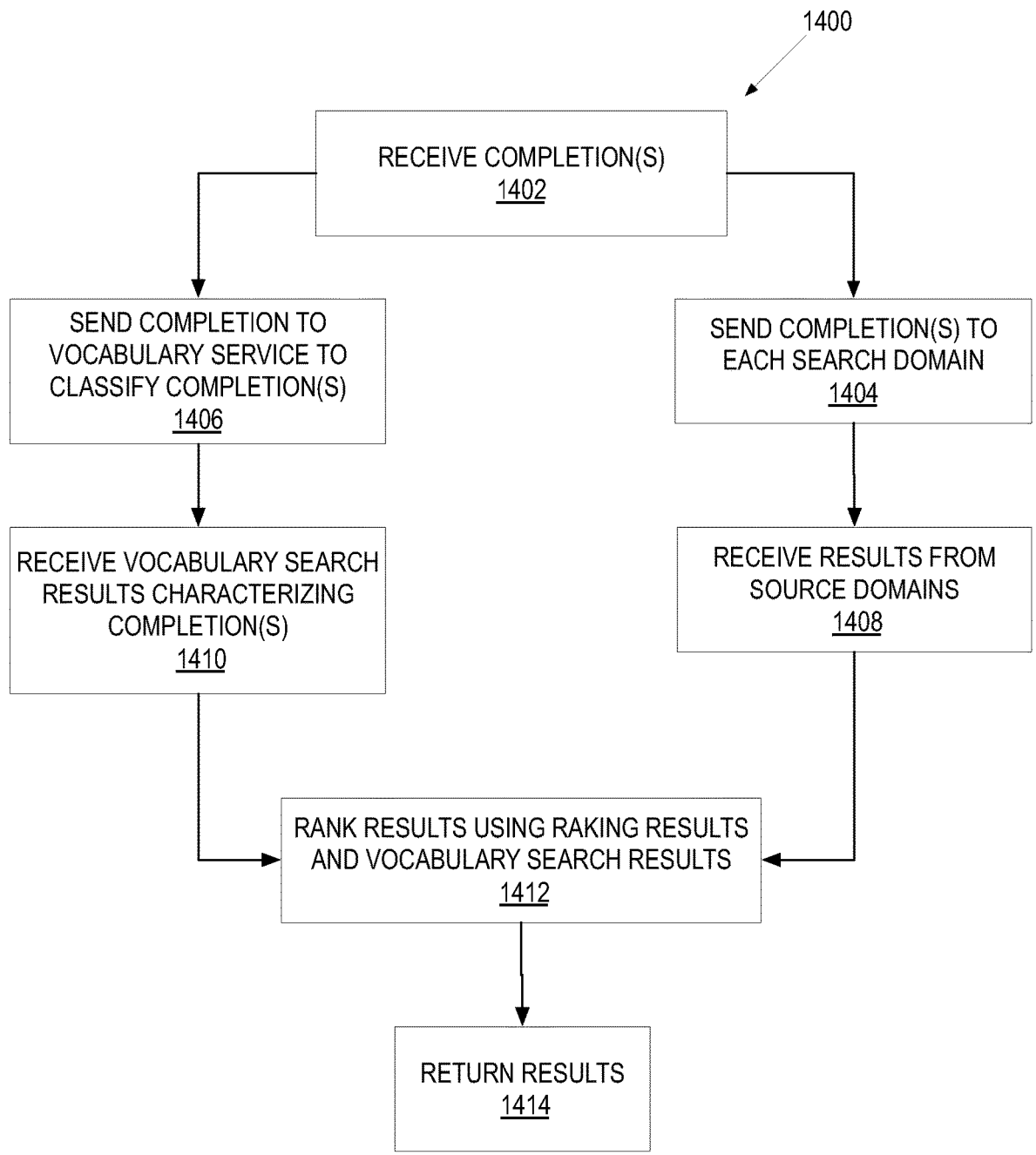
FIG. 14 is a flow chart of one embodiment of a process to determine relevant results using a vocabulary service.

FIG. 14 is a flow chart of one embodiment of a process 1400 to determine relevant results using a vocabulary service for the query completion. In one embodiment, the blender/ranker 1306 performs process 1400 to determine relevant results using a vocabulary service for the query completion as described in FIG. 13 above. In FIG. 14, process 1400 begins by receiving query completions at block 1402. In one embodiment, the received query completions are the completions determined by process 600 in response to receiving a query prefix. In one embodiment, process 1400 performs blocks 1404 and 1408 in one parallel stream and blocks 1406 and 1410 in another parallel stream. At block 1404, process 1400 sends the query completions to the different search domains to determine possible relevant results. In one embodiment, each of the search domains uses the received query completions to determine relevant results for that search domain. In one embodiment, the multiple search domain process each of the query completions in parallel. Process 1400 sends the query completion(s) to the vocabulary service to characterize each of the completion(s). In one embodiment, the vocabulary service characterizes each of the query completion(s) by determining if the query completion(s) is a query about a person, place, thing, or another type of information. Characterizing the query completion(s) is further described in FIG. 15 below. Process 1400 receives the search results from the multiple search domains at block 1408. In one embodiment, each of the search results includes a set of scores that characterizes that result from the corresponding search domain.

At block 1410, process 1400 receives the vocabulary search results characterizing the query completion(s). In one embodiment, the characterization of the query completion(s) indicates the type of information that each query completion is searching for. For example and in one embodiment, the query completion(s) is a query about a person, place, thing, or another type of information. In one embodiment, the two parallel streams converge at block 1412. Process 1400 uses the query completion characterization to rank and filter the relevant results for that query completion at block 1412. In one embodiment, if the query completion is indicated to be a search for a person, the results from the wiki domain regarding a person results from the search may be ranked higher. For example and in one embodiment, if the query completion is characterized as searching for a movie, the results from reviews or local show times of that movie can be ranked higher. As another example, if the query completion is indicated to be a place, the results from the maps search domain can be ranked higher as well as a wiki entry about this place. As a further example, if the query completion is indicated to be about an artist, the media search domain results can be ranked higher. Ranking using query completion is also described in FIG. 7 above. In another embodiment, the feedback index can be a signal domain that is used to rank and/or filter the relevant results. In this embodiment, process 1400 uses the number of engagement events to rank higher a result and uses the number of abandonment events to rank lower a result. In one embodiment, process 1400 additionally ranks and filters the results as described in FIG. 7, block 708 above. Process 1400 returns the ranked, filtered results at block 1414.

Figure 15:
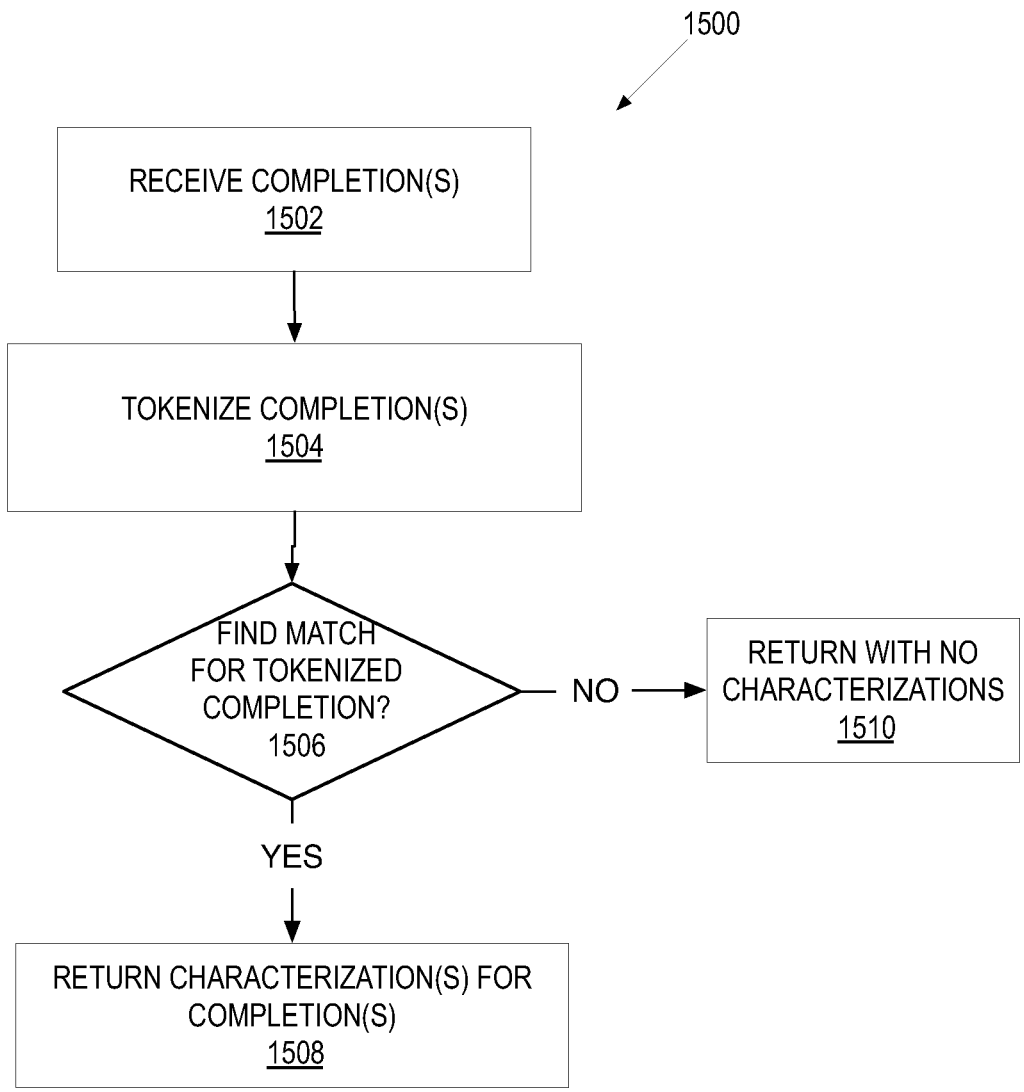
FIG. 15 is a flow chart of one embodiment of a process to characterize a query completion.

As described above, process 1400 uses a vocabulary service to characterize a query completion. FIG. 15 is a flow chart of one embodiment of a process 1500 to characterize a query completion. In FIG. 15, process 1500 receives the query completion(s) at block 1502. At block 1504, process 1500 tokenizes each query completion. In one embodiment, tokenizing a completion is separating the query completion into separate tokens (e.g., words, phrases, plural/singular variations). For the tokenized query completion, process 1500 determines a match for the tokenized completion in a knowledge base. In one embodiment, the knowledge base is a database of words or phrases mapped to a category. For example and in one embodiment, the knowledge base can include entries such as {Eiffel Tower→place}, {Michael Jackson→artist}, {Barack Obama→president}, {Black Widow→spider}, etc. In one embodiment, the knowledge base is built using an ontology. In one embodiment, process 1500 uses a term frequency matching algorithm to determine a match of the query completion in the knowledge base. For example and in one embodiment, if the query completion is "Who is Michael Jackson?" process 1500 can match on the terms "Michael," "Jackson," or "Michael Jackson". In this example, process 1500 would try to find the longest match in the knowledge database. If the knowledge base has matches for "Michael," "Jackson," and "Michael Jackson," the match for "Michael Jackson" would be used. If there is a match for one or more of the query completions, process 1500 returns the match(es) at block 1508. For example and in one embodiment, process 150 can return "person," "artist," or another type of characterization for the query completion "Who is Michael Jackson?" If there are no matches, process 1500 return with no characterizations.

Figure 16:
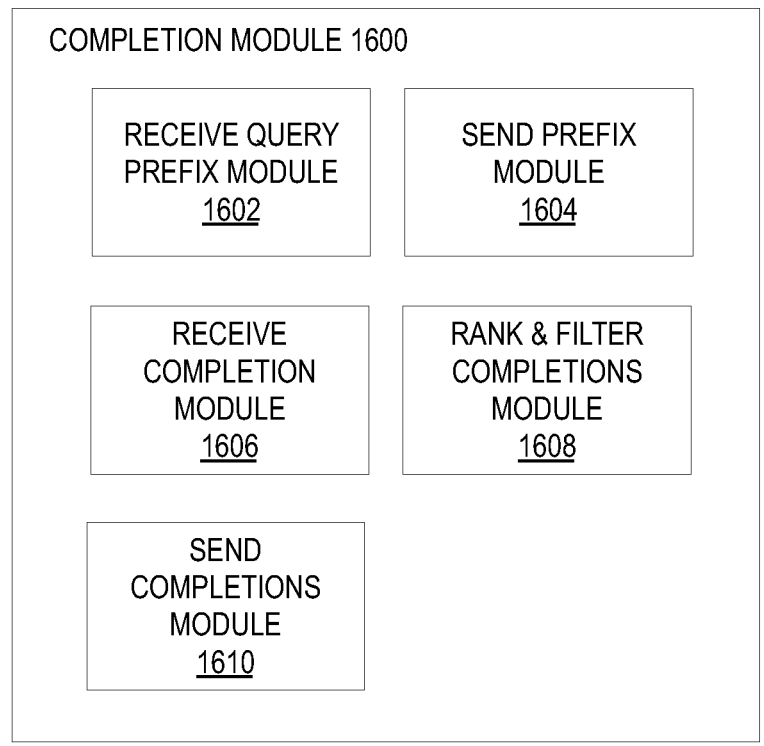
FIG. 16 is a block diagram of one embodiment of a completion module to determine query completions from multiple search domains.

FIG. 16 is a block diagram of one embodiment of a completion module 1600 to determine query completions from multiple search domains. In one embodiment, the completion module 1600 includes receive query prefix module 1602, send prefix module 1604, receive completion module 1606, rank & filter completions module 1608, and send completions module 1610. In one embodiment, the receive query prefix module 1602 receives the query prefixes as described in FIG. 6, block 602 above. The send prefix module 1604 sends the query prefixes to the different search domains as described in FIG. 6, block 604 above. The receive completion module 1606 receives the query completion as described in FIG. 6, block 606 above. The rank & filter completions module 1608 ranks and filters the received query completions as described in FIG. 6, block 608 above. The send completions module 1610 sends the query completions to the relevant results module as described in FIG. 6, block 610 above.

Figure 17:
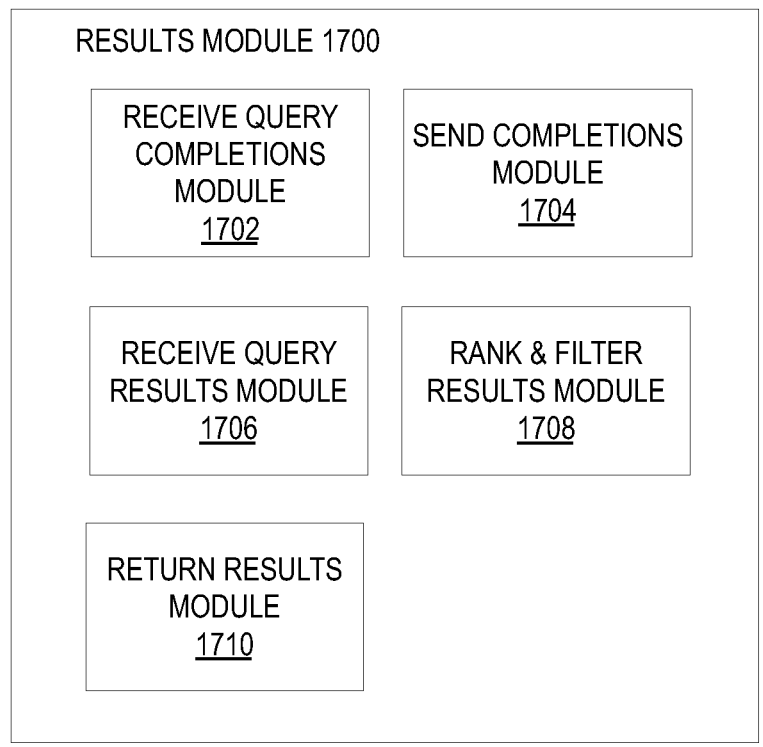
FIG. 17 is a block diagram of one embodiment of a results module to determine relevant results over multiple search domains from a determined query completion.

FIG. 17 is a block diagram of one embodiment of a results module 1700 to determine relevant results over multiple search domains from a determined query completion. In one embodiment, the results module 1700 includes a receive query completions module 1702, send completions module 1704, receive query results module 1706, rank and filter module 1708, and return results module 1710. In one embodiment, the receive query completions module 1702 receives the query completions as described in FIG. 7, block 702 above. The send completions module 1704 sends the completions to the multiple search domains as described in FIG. 7, block 704 above. The receive query results module 1706 receives the query results from the multiple search domains as described in FIG. 7, block 706 above. The rank and filter module 1708 ranks and filters the query results as described in FIG. 7, block 708 above. The return results module 1710 returns the query results as described in FIG. 7, block 710 above.

Figure 18:
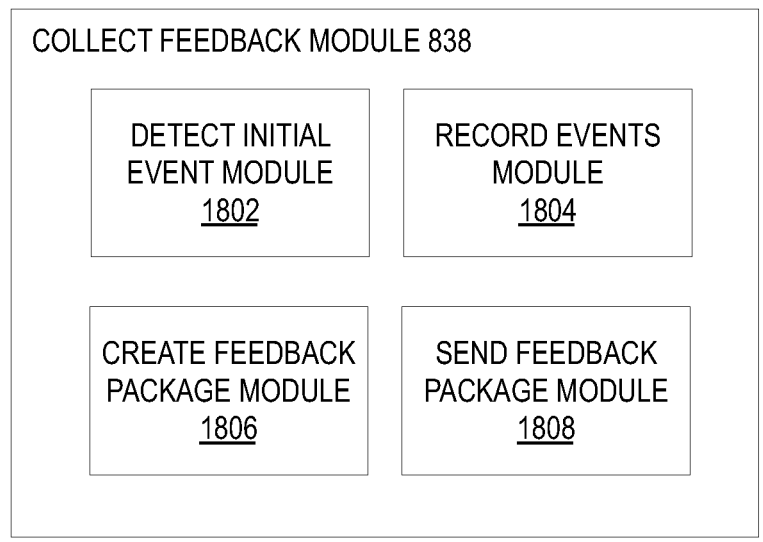
FIG. 18 is a block diagram of one embodiment of a collect feedback module to collect user feedback during a user search session.

FIG. 18 is a block diagram of one embodiment of a collect feedback module 838 to collect user feedback during a user search session. In one embodiment, the collect feedback module 838 includes a detect render event module 1802, record events module 1804, create feedback package module 1806, and send feedback module 1808. In one embodiment, the detect initial event module 1802 detects an initial event to start a user search session as described in FIG. 10, block 1002 above. The record events module 1804 records the events during the user search session as described in FIG. 10, block 1004 above. The create feedback package module 1806 create a feedback package as described in FIG. 10, block 1006 above. The send feedback module 1808 sends the feedback package as described in FIG. 10, block 1008 above.

Figure 19:
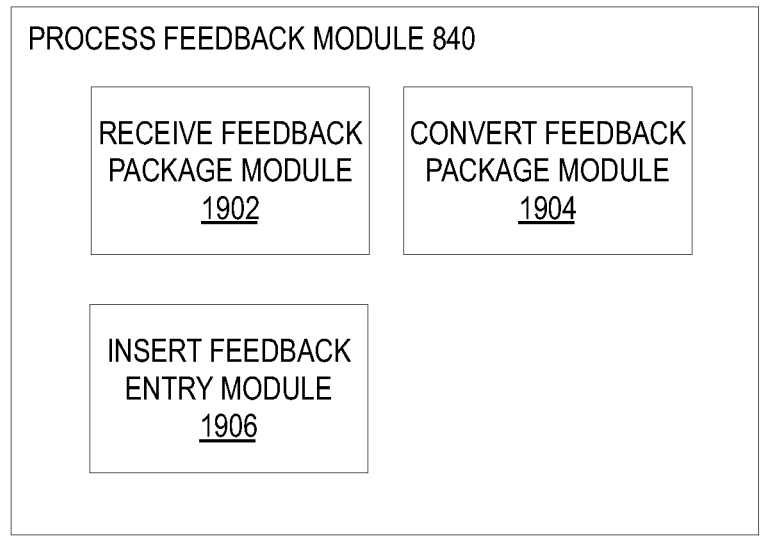
FIG. 19 is a block diagram of one embodiment of a process feedback module to incorporate user feedback during into a feedback index.

FIG. 19 is a block diagram of one embodiment of a process feedback module 840 to incorporate user feedback during into a feedback index. In one embodiment, the process feedback module 840 includes a receive feedback package module 1902, convert feedback package module 1904, and insert feedback entry module 1906. In one embodiment, the receive feedback package module 1902 receives the feedback module as described in FIG. 11, block 1102. The convert feedback package module 1904 converts the feedback package as described in FIG. 11, block 1104. The insert feedback entry module 1906 insert a feedback index entry as described in FIG. 11, block 1106.

Figure 20:
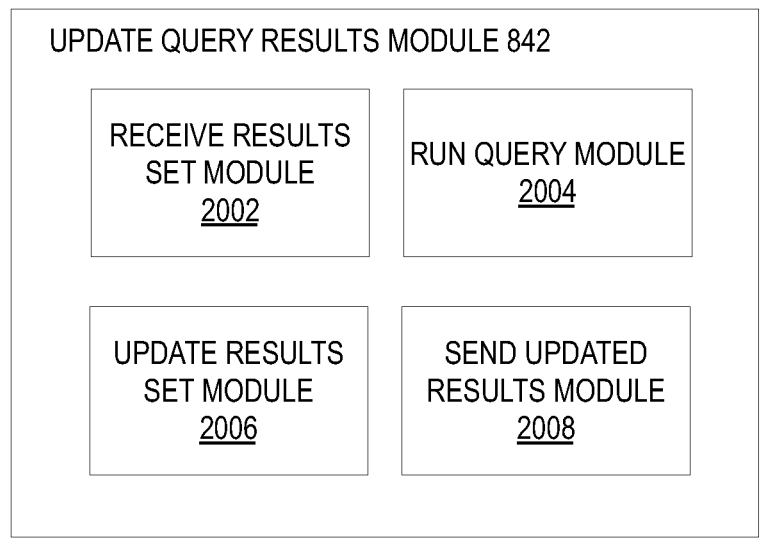
FIG. 20 is a block diagram of one embodiment of an update query results module to use the user feedback to update a results cache.

FIG. 20 is a block diagram of one embodiment of an update query results module 842 to use the user feedback to update a results cache. In one embodiment, the update results cache 842 includes a receive results set module 2002, run query module, 2004, update results set module 2006, and send updated results module 2008. In one embodiment, the receive results set module 2002 receives the results set as described in FIG. 12, block 1202. The run query module 2004 runs the queries using the feedback index as described in FIG. 12, block 1204. The update results set module 2006 updates the results set as described in FIG. 12, block 1206. The send updated results module 2008 sends the updated results set as described in FIG. 12, block 1202.

Figure 21:
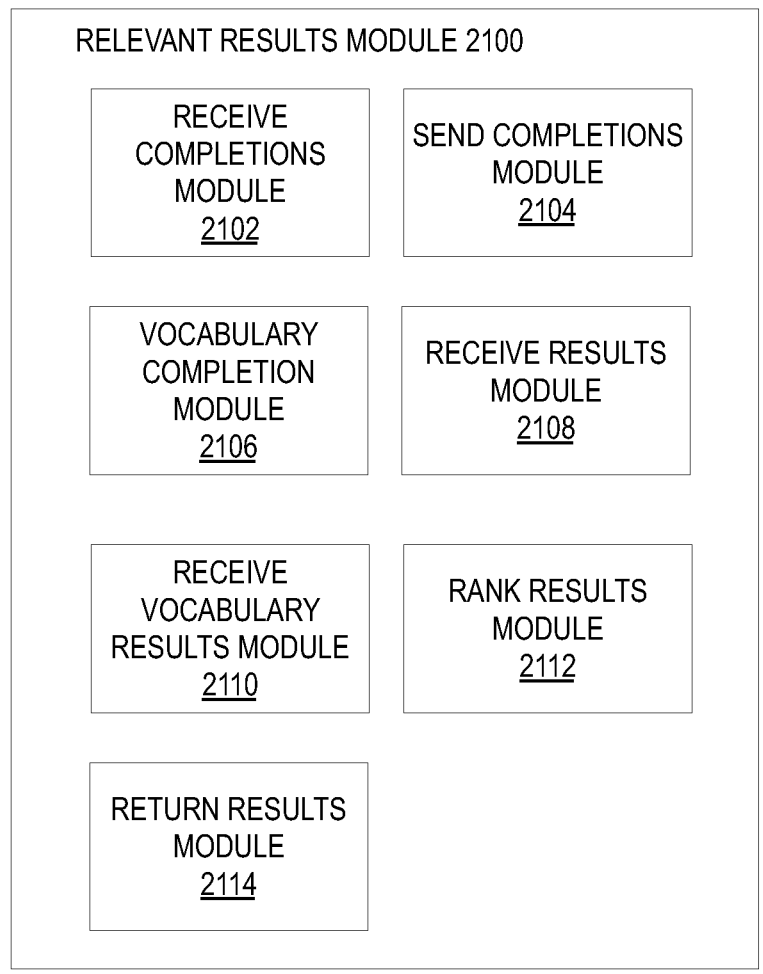
FIG. 21 is a block diagram of one embodiment of a process feedback module to incorporate user feedback during into a feedback index.

FIG. 21 is a block diagram of one embodiment of a relevant results module 2100 to determine relevant results using a vocabulary service for the query completion. In one embodiment, the relevant results module 2100 includes a receive completions module 2102, send completions module 2104, vocabulary completion module 2106, receive results module 2108, receive vocabulary results module 2110, rank results module 2112, and return results module 2114. In one embodiment, the receive completions module 2102 receives the query completions as described in FIG. 14, block 1402. The send completions module 2104 sends the query completions to the multiple search domains receives the query completions as described in FIG. 14, block 1404. The vocabulary completion module 2106 sends the query completions to the vocabulary service as described in FIG. 14, block 1406. The receive results module 2108 receives the query results from the multiple search domains as described in FIG. 14, block 1408. The receive vocabulary results module 2110 receives the vocabulary service characterization as described in FIG. 14, block 1410. The rank results module 2112 ranks the search domain results as described in FIG. 14, block 1412. The return results module 2114 returns the ranks results as described in FIG. 14, block 1414.

Figure 22:
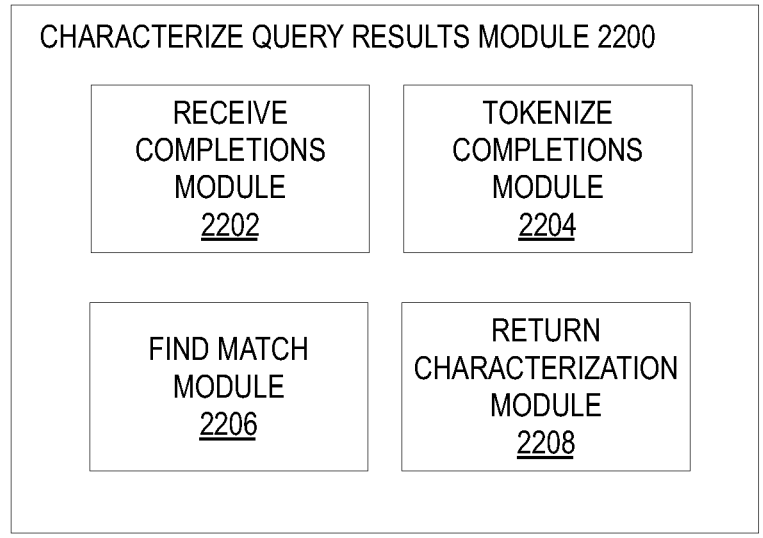
FIG. 22 is a block diagram of one embodiment of an update query results module to use the user feedback to update a results cache.

FIG. 22 is a block diagram of one embodiment of a characterize query module 2200 to characterize a query completion. In one embodiment, the characterize query results module 2200 includes a receive completions module 2202, tokenize completions module 2204, find match module 2206, and return characterization module 2208. In one embodiment, the receive completions module 2202 receives the completions as described in FIG. 15, block 1502 above. The tokenize completions module 2204 tokenizes the completions as described in FIG. 15, block 1504 above. The find match module 2206 find a match for the tokenized completion in the knowledge base as described in FIG. 15, block 1506 above. The return characterization module 2208 returns the characterization as described in FIG. 15, block 1508 above.

Figure 23:
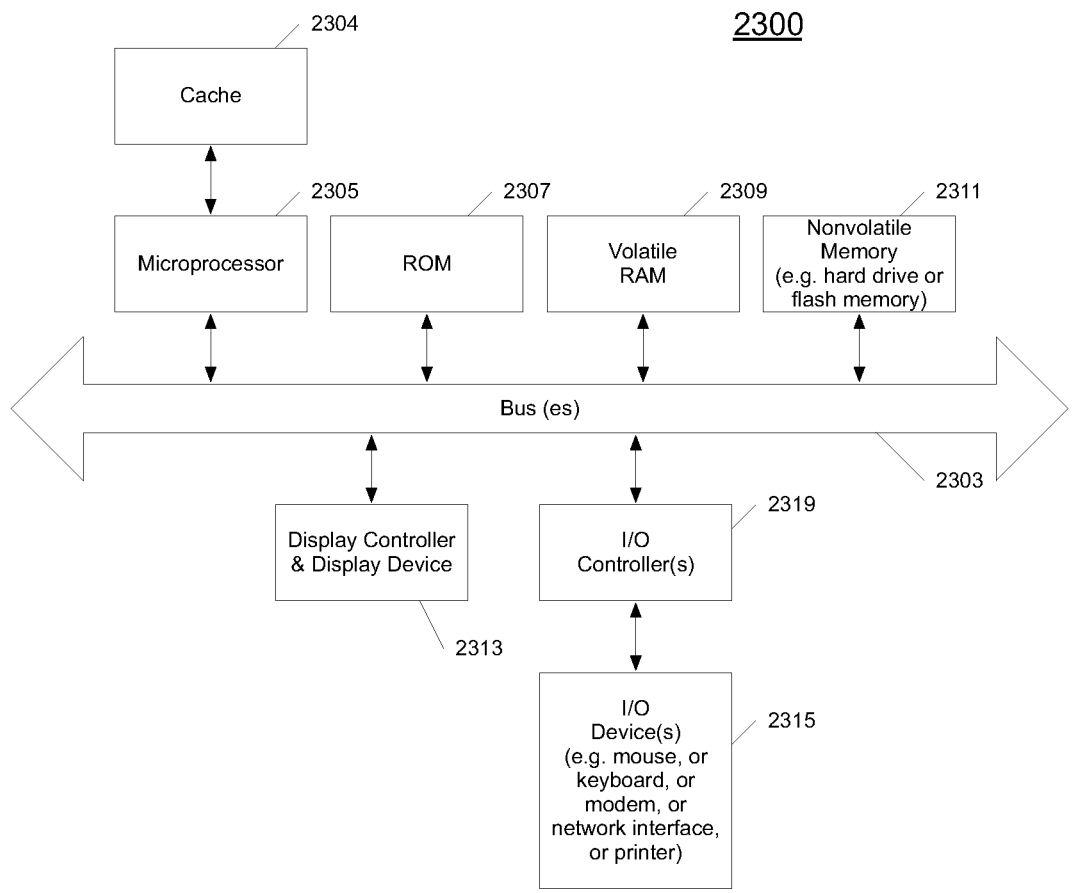
FIG. 23 illustrates one example of a typical computer system, which may be used in conjunction with the embodiments described herein.

FIG. 23 shows one example of a data processing system 2300, which may be used with one embodiment of the present invention. For example, the system 2300 may be implemented including a device 100 as shown in FIG. 1. Note that while FIG. 23 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 23, the computer system 2300, which is a form of a data processing system, includes a bus 2303 which is coupled to a microprocessor(s) 2305 and a ROM (Read Only Memory) 2307 and volatile RAM 2309 and a non-volatile memory 2311. The microprocessor 2305 may include one or more CPU(s), GPU(s), a specialized processor, and/or a combination thereof. The microprocessor 2305 may retrieve the instructions from the memories 2307, 2309, 2311 and execute the instructions to perform operations described above. The bus 2303 interconnects these various components together and also interconnects these components 2305, 2307, 2309, and 2311 to a display controller and display device 2313 and to peripheral devices such as input/output (I/O) devices which may be mice, keyboards, modems, network interfaces, printers and other devices which are well known in the art. Typically, the input/output devices 2315 are coupled to the system through input/output controllers 2313. The volatile RAM (Random Access Memory) 2309 is typically implemented as dynamic RAM (DRAM), which requires power continually in order to refresh or maintain the data in the memory.

The mass storage 2311 is typically a magnetic hard drive or a magnetic optical drive or an optical drive or a DVD RAM or a flash memory or other types of memory systems, which maintain data (e.g. large amounts of data) even after power is removed from the system. Typically, the mass storage 2311 will also be a random access memory although this is not required. While FIG. 23 shows that the mass storage 2311 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 2303 may include one or more buses connected to each other through various bridges, controllers and/or adapters as is well known in the art.

Figure 24:
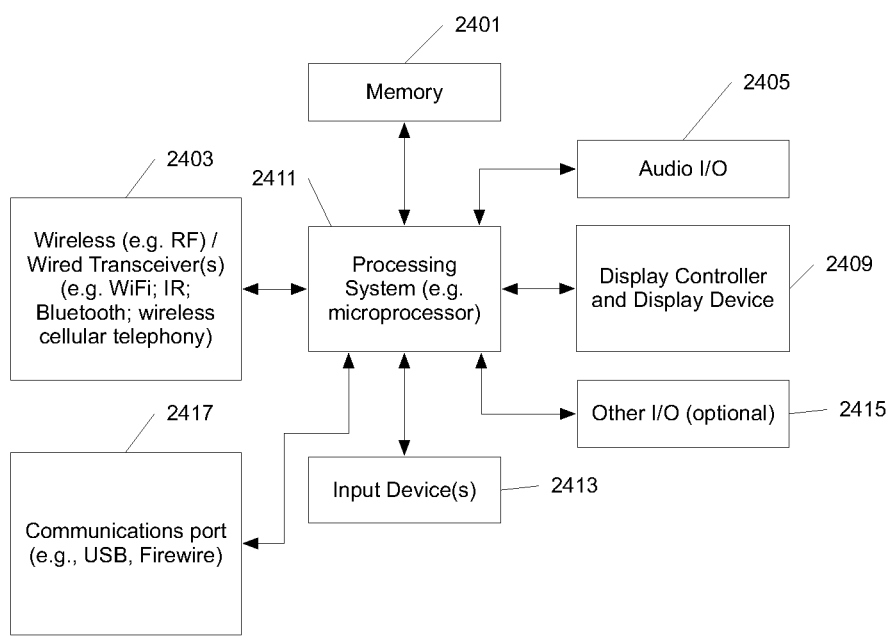
FIG. 24 shows an example of a data processing system, which may be used with one embodiment of the present invention.

FIG. 24 shows an example of another data processing system 2400 which may be used with one embodiment of the present invention. For example, system 2400 may be implemented as a device 100 as shown in FIG. 1. The data processing system 2400 shown in FIG. 24 includes a processing system 2411, which may be one or more microprocessors, or which may be a system on a chip integrated circuit, and the system also includes memory 2401 for storing data and programs for execution by the processing system. The system 2400 also includes an audio input/output subsystem 2405, which may include a microphone and a speaker for, for example, playing back music or providing telephone functionality through the speaker and microphone.

A display controller and display device 2409 provide a visual user interface for the user; this digital interface may include a graphical user interface which is similar to that shown on a Macintosh computer when running OS X operating system software, or Apple iPhone when running the iOS operating system, etc. The system 2400 also includes one or more wireless transceivers 2403 to communicate with another data processing system, such as the system 2400 of FIG. 24. A wireless transceiver may be a WLAN transceiver, an infrared transceiver, a Bluetooth transceiver, and/or a wireless cellular telephony transceiver. It will be appreciated that additional components, not shown, may also be part of the system 2400 in certain embodiments, and in certain embodiments fewer components than shown in FIG. 24 may also be used in a data processing system. The system 2400 further includes one or more communications ports 2417 to communicate with another data processing system, such as the system 1500 of FIG. 15. The communications port may be a USB port, Firewire port, Bluetooth interface, etc.

The data processing system 2400 also includes one or more input devices 2413, which are provided to allow a user to provide input to the system. These input devices may be a keypad or a keyboard or a touch panel or a multi touch panel. The data processing system 2400 also includes an optional input/output device 2415 which may be a connector for a dock. It will be appreciated that one or more buses, not shown, may be used to interconnect the various components as is well known in the art. The data processing system shown in FIG. 24 may be a handheld computer or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device or an embedded device or other consumer electronic devices. In other embodiments, the data processing system 2400 may be a network computer or an embedded processing device within another device, or other types of data processing systems, which have fewer components or perhaps more components than that shown in FIG. 24.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod® or iPod Nano® media player from Apple, Inc. of Cupertino, Calif., a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s). Examples of a portable media player are described in published U.S. Pat. No. 7,345,671 and U.S. published patent number 2004/0224638, both of which are incorporated herein by reference.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "detecting," "ranking," "receiving," "determining," "computing," "sending," "modifying," "tokenize," "filtering," "adding," "creating," finding," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to perform a method to generate a plurality of ranked query results from a query over a plurality of separate search domains, the method comprising:
   receiving the query;
   determining a plurality of query completions across the plurality of separate search domains using the query, each separate search domain having a pre-determined search domain type;
   sending the plurality of query completions to a vocabulary service, for each query completion in a subset of the plurality of query completions at the vocabulary service,
  comparing at least some of the content of the query completion to a knowledge base, wherein the knowledge base maps at least some of the content of the query completion to a pre-determined category of information from a plurality of pre-determined categories of information, and
  determining a query completion type based at least in part on the comparison, wherein the query completion type indicates the pre-determined category of information that the query completion is querying for;
sending the query completions to the plurality of separate search domains;
receiving a plurality of query results from each search domain, wherein each query result corresponds to at least one query completion and at least one search domain;
for each query result,
  determining a score for that query result, and
  boosting the score for that query result when the at least one query completion corresponding to the query result has a query completion type that matches the search domain type of the at least one search domain corresponding to the query result; and
ranking the query results based on at least scores of the query results.

2. The non-transitory machine-readable medium of claim 1, wherein the query type is selected from the group of a person, place, and thing.

3. The non-transitory machine-readable medium of claim 1, further comprising:
filtering the plurality of search results.

4. The non-transitory machine-readable medium of claim 1, wherein the each of the plurality of separate search domains is selected from the group consisting of maps search domain, media store search domain, online encyclopedia search domain, and sites search domain.

5. The non-transitory machine-readable medium of claim 1, wherein the method comprises:
tokenizing the query completion; and
finding a match for the tokenized query completion in the knowledge base.

6. The non-transitory machine-readable medium of claim 5, wherein the finding a match comprises:
finding a longest match among the tokens in the query completion.

7. The non-transitory machine-readable medium of claim 5, wherein the tokenizing the query completion comprises:
separating the query completion into tokens.

8. The non-transitory machine-readable medium of claim 7, wherein the token is selected for the group consisting of a word and a phrase.

9. A method to generate a plurality of ranked query results from a query over a plurality of separate search domains, the method comprising:
receiving the query;
determining a plurality of query completions across the plurality of separate search domains using the query, each separate search domain having a pre-determined search domain type;
sending the plurality of query completions to a vocabulary service;
for each query completion in a subset of the plurality of query completions at the vocabulary service,
  comparing at least some of the content of the query completion to a knowledge base, wherein the knowledge base maps at least some of the content of the query completion to a pre-determined category of information from a plurality of pre-determined categories of information, and
  determining a query completion type based at least in part on the comparison, wherein the query completion type indicates the pre-determined category of information that the query completion is querying for;
sending the query completions to the plurality of separate search domains;
receiving a plurality of query results from each search domain, wherein each query result corresponds to at least one query completion and at least one search domain; and
for each query result,
  determining a score for that query result, and
  boosting the score for that query result when the at least one query completion corresponding to the query result has a query completion type that matches the search domain type of the at least one search domain corresponding to the query result; and
ranking the query results based on at least scores of the query results.

10. The method of claim 9, wherein the query type is selected from the group of a person, place, and thing.

11. The method of claim 9, further comprising:
filtering the plurality of search results.

12. The method of claim 9, wherein the each of the plurality of separate search domains is selected from the group consisting of maps search domain, media store search domain, online encyclopedia search domain, and sites search domain.

13. The method of claim 9, wherein the method comprises:
tokenizing the query completion; and
finding a match for the tokenized query completion in the knowledge base.

14. The method of claim 13, wherein the finding a match comprises:
finding a longest match among the tokens in the query completion.

15. The method of claim 13, wherein the tokenizing the query completion comprises:
separating the query into tokens.

16. A device to generate a plurality of ranked query results from a query over a plurality of separate search domains, the device comprising:
at least one processor;
a memory coupled to the processor though a bus; and
a process executed from the memory by the processor that causes the processor to receive the query, determine a plurality of query completions across the plurality of separate search domains using the query, each separate search domain having a pre-determined search domain type, sending the plurality of query completions to a vocabulary service, for each query completion in a subset of the plurality of query completions at the vocabulary service, comparing at least some of the content of the query completion to a knowledge base, wherein the knowledge base maps at least some of the content of the query completion to a pre-determined category of information from a plurality of pre-determined categories of information, and determining a query completion type based at least in part on the comparison, wherein the query completion type indicates the pre-determined category of information that the query completion is querying for, sending the query completions to the plurality of separate search domains, receiving a plurality of query results from each search domain, wherein each query result corresponds to at least one query completion and at least one search domain, for each query result, determining a score for that query result, and boosting the score for that query result when the at least one query completion corresponding to the query result has a query completion type that matches the search domain type of the at least one search domain corresponding to the query result; and ranking the query results based on at least scores of the query results.

17. The device of claim 16, wherein the query type is selected from the group of a person, place, and thing.

18. The device of claim 16, wherein the process further causes the processor to filter the plurality of search results.

19. The machine-readable medium of claim 1, wherein at least some of the plurality of separate search domains has different scoring metrics based on different scoring inputs that are used to calculate this score for a query completion from that search domain.

20. The method of claim 9, wherein at least some of the plurality of separate search domains has different scoring metrics based on different scoring inputs that are used to calculate this score for a query completion from that search domain.

21. The device of claim 16, wherein at least some of the plurality of separate search domains has different scoring metrics based on different scoring inputs that are used to calculate this score for a query completion from that search domain.

22. The machine-readable medium of claim 1, wherein the subset of the plurality query completions is selected based on at least scores of the query completions determined by the corresponding search domain.

23. The method of claim 9, wherein the subset of the plurality query completions is selected based on at least scores of the query completions determined by the corresponding search domain.

24. The device of claim 16, wherein the subset of the plurality query completions is selected based on at least scores of the query completions determined by the corresponding search domain.

* * * * *